United States Patent
Lotter et al.

(10) Patent No.: US 7,680,681 B2
(45) Date of Patent: Mar. 16, 2010

(54) SHARED INSURANCE INDUSTRY SYSTEM FOR NON-DISRUPTIVE ENHANCEMENT AND SUBSTITUTION OF INSURANCE TRANSACTION PROCESSING

(75) Inventors: Robert A Lotter, San Juan Capistrano, CA (US); Timothy S. Allard, Tustin, CA (US); John W. Baughn, Irvine, CA (US)

(73) Assignee: eAgency, Inc., Newport Beach, CA (US)

( * ) Notice: Subject to any disclaimer, the term of this patent is extended or adjusted under 35 U.S.C. 154(b) by 1294 days.

(21) Appl. No.: 10/133,112

(22) Filed: Apr. 26, 2002

(65) Prior Publication Data

US 2002/0184163 A1     Dec. 5, 2002

Related U.S. Application Data

(60) Provisional application No. 60/294,810, filed on May 31, 2001.

(51) Int. Cl.
G06Q 40/00     (2006.01)
(52) U.S. Cl. .................................................. 705/4
(58) Field of Classification Search ............. 705/2–3, 705/4
See application file for complete search history.

(56) References Cited

U.S. PATENT DOCUMENTS

| | | | |
|---|---|---|---|
| 4,567,359 A * | 1/1986 | Lockwood ............. 235/381 |
| 4,750,119 A * | 6/1988 | Cohen et al. ............. 705/14 |
| 4,799,156 A | 1/1989 | Shavit et al. |
| 4,831,526 A * | 5/1989 | Luchs et al. ............ 705/4 |
| 5,475,833 A | 12/1995 | Dauerer et al. |
| 5,523,942 A * | 6/1996 | Tyler et al. ............ 705/4 |
| 5,537,315 A * | 7/1996 | Mitcham ............ 705/4 |
| 5,560,005 A | 9/1996 | Hoover et al. |
| 5,608,898 A | 3/1997 | Turpin et al. |
| 5,634,053 A | 5/1997 | Noble et al. |
| 5,729,742 A | 3/1998 | Harbinski et al. |
| 5,774,716 A | 6/1998 | Harbinski et al. |
| 5,845,256 A * | 12/1998 | Pescitelli et al. ............ 705/4 |
| 5,855,005 A * | 12/1998 | Schuler et al. ............ 705/4 |
| 5,870,733 A | 2/1999 | Bass et al. |
| 5,913,029 A | 6/1999 | Shostak |
| 5,950,169 A | 9/1999 | Borghesi et al. |

(Continued)

OTHER PUBLICATIONS eHealthInsurance.com. Copyright 1998-1999.*

*Primary Examiner*—Gerald J. O'Connor
*Assistant Examiner*—Sheetal R Rangrej
(74) *Attorney, Agent, or Firm*—Haynes and Boone, LLP

(57) ABSTRACT

Apparatus and methods for implementing a new insurance industry business processing system, called a "Shared Industry Platform", are described. A network-based computing platform is defined which includes a communications portal and industry shared databases which are controlled by enabling application and security software and which may be accessed through a global computer network by insurance company computers, managing general agency computers, selling agent computers, and consumer computers. This shared industry platform allows communication among the various components of the insurance industry in a flexible manner as specified by each insurance company, no matter what the company's customary internal processing system might be. The present invention provides an evolutionary, non-disruptive means for interconnecting insurance company computers, managing general agency computers, agent computers, and consumer computers to allow interactive communication and secured business processing and data exchange over the Internet.

35 Claims, 25 Drawing Sheets

U.S. PATENT DOCUMENTS

| | | |
|---|---|---|
| 5,991,733 A | 11/1999 | Aleia et al. |
| 5,995,939 A | 11/1999 | Berman et al. |
| 6,044,352 A * | 3/2000 | Deavers .................... 705/4 |
| 6,044,381 A | 3/2000 | Boothby et al. |
| 6,073,138 A | 6/2000 | de l'Etraz et al. |
| 6,141,664 A | 10/2000 | Boothby |
| 6,167,378 A | 12/2000 | Webber, Jr. |
| 6,185,555 B1 | 2/2001 | Sprenger et al. |
| 6,212,529 B1 | 4/2001 | Boothby et al. |
| 6,283,761 B1 * | 9/2001 | Joao ........................ 434/236 |
| 6,965,868 B1 * | 11/2005 | Bednarek ..................... 705/9 |
| 2001/0037265 A1 * | 11/2001 | Kleinberg .................... 705/27 |
| 2002/0049617 A1 * | 4/2002 | Lencki et al. ................. 705/4 |
| 2002/0091991 A1 * | 7/2002 | Castro ....................... 717/106 |
| 2002/0147618 A1 * | 10/2002 | Mezrah et al. ................ 705/4 |
| 2002/0184163 A1 * | 12/2002 | Lotter et al. ................. 705/67 |
| 2002/0198744 A1 * | 12/2002 | Sagalow et al. ............... 705/4 |

* cited by examiner

MEMBER DATABASE 61

| Member Identifier | Member Name | Organization Type | SIP Role | Register Date |
|---|---|---|---|---|
| M01 | INSCOA | corporation | company | 01/01/2000 |
| M02 | INSCOB | corporation | company | 02/01/2000 |
| M03 | MGA1 | corporation | MGA | 04/01/2000 |
| M04 | MGA2 | corporation | MGA | 05/01/2000 |
| M05 | AGENT1 | person | agent | 07/01/2000 |
| M06 | AGENT2 | person | agent | 08/01/2000 |
| M07 | AGENT3 | person | agent | 09/01/2000 |
| M08 | AGENT4 | person | agent | 10/01/2000 |
| M09 | CONSUMER1 | person | consumer | 10/01/2000 |
| M10 | CONSUMER2 | person | consumer | 11/01/2000 |
| M11 | CONSUMER3 | person | consumer | 12/01/2000 |
| M12 | CONSUMER4 | person | consumer | 12/15/2000 |

Fig 13

DISTRIBUTION DATABASE 62

| Distribution Path Identifier | Agent Name | Agent Member Identifier | MGA Name | MGA Member Identifier | Company Name | Company Member Identifier | Distribution Path Type | Start Date |
|---|---|---|---|---|---|---|---|---|
| D01 | AGENT1 | M05 | MGA1 | M03 | INSCOA | M01 | appoints | 04/01/2000 |
| D02 | AGENT1 | M05 | MGA1 | M03 | INSCOB | M02 | appoints | 05/01/2000 |
| D03 | AGENT2 | M06 | MGA1 | M03 | INSCOA | M01 | appoints | 04/01/2000 |
| D04 | AGENT2 | M06 | MGA2 | M04 | INSCOB | M02 | appoints | 05/01/2000 |
| D05 | AGENT3 | M07 | MGA2 | M04 | INSCOA | M01 | appoints | 07/01/2000 |
| D06 | AGENT3 | M07 | | | INSCOB | M02 | appoints | 08/01/2000 |
| D07 | AGENT4 | M08 | | | INSCOB | M02 | appoints | 07/01/2000 |

Fig 14

PRODUCT DATABASE 63

| Product Identifier | Product Name | Company Name | Commission Code | Commission Description | Product Effective Date |
|---|---|---|---|---|---|
| P01 | LIFE1 | INSCOA | A | 5% equal split | 04/01/2000 |
| P02 | LIFE 2 | INSCOA | A | 5% equal split | 05/01/2000 |
| P03 | ANNUITY1 | INSCOA | B | 10% equal split | 04/01/2000 |
| P04 | ANNUITY2 | INSCOA | B | 10% equal split | 05/01/2000 |
| P05 | GOODLIFE 1 | INSCOB | A | 5% equal split | 07/01/2000 |
| P06 | GOODLIFE 2 | INSCOB | C | 15% equal split | 08/01/2000 |
| P07 | GOODANNUITY1 | INSCOB | B | 10% equal split | 07/01/2000 |

Fig 16

APPLICATION DATABASE 64

| Application Identifier | Product Name | Product Facevalue | Company Name | Consumer Name | Agent Name | Application Date |
|---|---|---|---|---|---|---|
| A01 | LIFE1 | $100,000 | INSCOA | CONSUMER1 | AGENT1 | 04/01/2000 |
| A02 | LIFE1 | $250,000 | INSCOA | CONSUMER2 | AGENT1 | 05/01/2000 |
| A03 | GOODANNUITY1 | $50,000 | INSCOB | CONSUMER3 | AGENT1 | 04/01/2000 |
| A04 | GOODANNUITY1 | $100,000 | INSCOB | CONSUMER4 | AGENT1 | 05/01/2000 |
| A05 | LIFE1 | $75,000 | INSCOA | CONSUMER5 | AGENT2 | 07/01/2000 |
| A06 | GOODANNUITY1 | $20,000 | INSCOB | CONSUMER6 | AGENT2 | 08/01/2000 |
| A07 | LIFE2 | $75,000 | INSCOA | CONSUMER7 | AGENT3 | 07/01/2000 |
| A08 | GOODLIFE2 | $100,000 | INSCOB | CONSUMER8 | AGENT3 | 07/01/2000 |
| A09 | GOODLIFE1 | $500,000 | INSCOB | CONSUMER9 | AGENT4 | 08/01/2000 |

Fig 18

SALE DATABASE 65

| Sale Identifier | Product Name | Company Name | Consumer Name | MGA Name | Agent Name | Sale Approval Date |
|---|---|---|---|---|---|---|
| S01 | LIFE1 | INSCOA | CONSUMER1 | MGA1 | AGENT1 | 04/06/2000 |
| S02 | LIFE1 | INSCOA | CONSUMER2 | MGA1 | AGENT1 | 05/06/2000 |
| S03 | GOODANNUITY1 | INSCOB | CONSUMER3 | MGA1 | AGENT1 | 04/06/2000 |
| S04 | GOODANNUITY1 | INSCOB | CONSUMER4 | MGA1 | AGENT1 | 05/06/2000 |
| S05 | LIFE1 | INSCOA | CONSUMER5 | MGA1 | AGENT2 | 07/06/2000 |
| S06 | GOODANNUITY1 | INSCOB | CONSUMER6 | MGA2 | AGENT2 | 08/06/2000 |
| S07 | LIFE2 | INSCOA | CONSUMER7 | MGA2 | AGENT3 | 07/06/2000 |
| S08 | GOODLIFE2 | INSCOB | CONSUMER8 |  | AGENT3 | 07/06/2000 |
| S09 | GOODLIFE1 | INSCOB | CONSUMER9 |  | AGENT4 | 08/06/2000 |

Fig 20

COMMISSION DATABASE 67

| Commission Identifier | Sale Identifier | Agent Comm | MGA Comm | Face Value | MGA Name | Agent Name | Commission Pay Date |
|---|---|---|---|---|---|---|---|
| C01 | S01 | $2,500 | $2,500 | $100,000 | MGA1 | AGENT1 | 04/10/2000 |
| C02 | S02 | $6,250 | $6,250 | $250,000 | MGA1 | AGENT1 | 05/10/2000 |
| C03 | S03 | $2,500 | $2,500 | $50,000 | MGA1 | AGENT1 | 04/10/2000 |
| C04 | S04 | $5,000 | $5,000 | $100,000 | MGA1 | AGENT1 | 05/10/2000 |
| C05 | S05 | $2,500 | $2,500 | $100,000 | MGA1 | AGENT2 | 07/10/2000 |
| C06 | S06 | $1,250 | $1,250 | $25,000 | MGA2 | AGENT2 | 08/10/2000 |
| C07 | S07 | $2,500 | $2,500 | $100,000 | MGA2 | AGENT3 | 07/10/2000 |
| C08 | S08 | $15,000 |  | $100,000 |  | AGENT3 | 07/10/2000 |
| C09 | S09 | $25,000 |  | $500,000 |  | AGENT4 | 08/10/2000 |

Fig 22

SALES AND COMMISSIONS REPORT DATABASE 68

| Report Identifier | Requester Name | Start Level | End Level | Report Qualifier | Report Date |
|---|---|---|---|---|---|
| R01 | INSCOA | company | agent | mga agents | 04/10/2000 |
| R02 | INSCOA | company | agent | direct agents | 05/10/2000 |
| R03 | INSCOA | company | consumer | western region | 04/10/2000 |
| R04 | INSCOA | agent | consumer | direct agents | 05/10/2000 |
| R05 | MGA1 | mga | agent | all agents | 07/10/2000 |
| R06 | AGENT1 | agent | agent | all | 08/10/2000 |
| R07 | AGENT2 | agent | agent | all | 07/10/2000 |
| R08 | AGENT3 | agent | agent | INSCOB | 07/10/2000 |
| R09 | AGENT4 | agent | consumer | all | 08/10/2000 |

Fig 24

SYNCHRONIZER DATABASE 69

| Company Name | Transaction Type | Program Location |
|---|---|---|
| INSCOA | Application | /A/Sync/Tran/Appl.exe |
| INSCOA | Sale | /A/Sync/Tran/Sale.exe |
| INSCOA | Commission | /A/Sync/Tran/Comm.exe |
| INSCOB | Application | /B/Sync/Tran/Appl.exe |
| INSCOB | Sale | /B/Sync/Tran/Sale.exe |
| INSCOB | Commission | /B/Sync/Tran/Comm.exe |
| INSCOC | Application | /C/Sync/Tran/Appl.exe |

SHARED INSURANCE INDUSTRY SYSTEM FOR NON-DISRUPTIVE ENHANCEMENT AND SUBSTITUTION OF INSURANCE TRANSACTION PROCESSING

CROSS-REFERENCE TO PROVISIONAL PATENT APPLICATION

The present patent application claims the benefit of the filing date of U.S. Provisional Patent Application Ser. No. 60/294,810, filed May 31, 2001 by Robert A. Lotter, Timothy Allard and John W. Baughn and entitled "A Shared Financial-Industry Platform for Non-Disruptive Enhancement and Substitution of Business Transactional Processing".

BACKGROUND OF THE INVENTION

This invention relates to computerized business methods for the insurance industry for providing improved services and for improving the handling of insurance related business transactions.

Conducting commercial enterprise by means of networked computers is an established fact of life in almost all industries, and use of a global computer network to extend business functionality into the homes and home offices of individuals is becoming pervasive. The most sophisticated of common public computer networks, the Internet, has rapidly advanced from its beginning as a communication tool for the scientific elite to its current state of being a common network to enable every interest of the average citizen. Technical knowledge on how to use the Internet is now taught in grade schools, and capability to access the Internet is available at prices comparable to the price of telephone service. According to statistics, the Internet audience is now approximately fifty percent of all households in the United States, and continues to expand steadily.

This revolution in networked-computer communication systems has led to the emergence of Internet-based businesses that make numerous products and services available to the consuming public. Indeed, many businesses have shown amazing rapid adaptation of pre-existing marketing and sales to selling via the Internet. Some businesses have come into existence entirely to offer products solely on the Internet. In either case, the "electronic shopping" offered by Internet businesses has quickly established itself as a desirable alternative to the traditional forms of shopping that require a trip to a retail outlet or service provider. The very language of business has now gained an entire lexicon of Internet phrases and meanings that allow an individual easily to apply traditional business language to Internet business functions, as when individuals using the Internet to transact commerce are described as participating in "e-commerce".

As the Internet has become a tool for both business and the consumer, the type of products and services available on it has expanded to include the financial services sector of the economy. And within the financial services sector, most banking, finance, and investment banking firms have become firmly entrenched in e-commerce. There is an entire class of industries, however, which have not exploited the Internet in a way that would gain them a business advantage. These industries are financial-service corporations whose initial business success required that a large, financially secure institution provide financial independence and strength upon which the security of its products and services would be predicated. For product marketing and sales, these industries invested in a personal agency sales force supported by a middle tier of branch offices or managing agencies, with control flowing from the corporate home office down through the managing agencies to the agent. All agents were typically captive to the corporation in the early formative years of such industries. This four-tier structure, comprised of company, general agency, agent, and consumer, has been a mainstay of financial products industries for more than a hundred years. A primary embodiment and exemplar of this class of industries is the insurance industry, and in particular, the life insurance industry.

The involvement of multiple companies, general agencies, agents and consumers in day-to-day relationships has a deleterious effect on the insurance industry. For example, an agent may form a relationship with one or more general agencies to distribute a product from one or more companies. In addition, an agent may have a direct relationship with a company to sell product directly to the consumer. From the standpoint of a consumer, it is unclear whether the agent is selling the policy from a company directly or through a general agency. In a situation where the agent is dealing directly with the company, the company may have more control over the agent, and ultimately more control over the information that is disseminated to the consumer. When dealing through a general agency, the company is one additional step removed from the agent and the consumer. Once a product is initiated, communication then may be routed directly from the company to the consumer.

Previously, insurance companies have been reluctant to sell directly to the consumer for fear of undermining the industry structure inherent in the existing hierarchy. In addition, a consumer may have difficulty in assessing where to obtain information regarding a product, not knowing whether they should go to an agent or to a company. As can be appreciated, this complex and confusing relationship of insurance industry structure is not efficient, creates unnecessary confusion and further impedes the ultimate goal of the consumer receiving a product from the company.

A general problem faced by the insurance industry and, importantly, not solved by it, is how to break free of the massive computerized administration systems that are the bedrock of their trustworthiness and reputation, in order to adapt quickly and radically to using the Internet to market and sell their products. The computer systems that form the bedrock of their information-intensive financial capabilities have become millstones around their necks, preventing them from modernizing and reaching out to new markets with new products.

The problem confronting, for example, the life insurance industry, has not been the computerization of back-office administration and computation functions. Indeed, many large life insurance companies have been technology leaders in financial and actuarial computation. Rather, the problem has been the lack of modernizing the product distribution arm of the industry by which agents sell products and services, and by which consumers receive information from their product providers. Despite the consumer's willingness to embrace e-commerce, the insurance industry has failed to capitalize on this trend.

The life insurance industry therefore suffers from a technology gap, as compared to other financial institutions. Each company operates a proprietary computerized administrative system whose operations are unique to the company's particular procedures and practices. This makes it seemingly impossible for companies to create new images and new market brands for themselves and their products. But it is exactly the new images that are needed by the independent sales force. They are desperate for fresh ideas and images to help sell products on the Internet, where any hint of an old or out-of-date image produces a glaring condemnation of the purveyor of the product. On the Internet, the fate of a stale marketing message is cruelly simple: "the messenger is instantly killed and the message instantly rejected".

Many households with Internet capability have the need and desire to purchase life insurance and other insurance products. A recent insurance survey revealed ten percent (10%) of consumers would buy a policy online, while twenty-seven percent (27%) said they were likely to gather insurance information on the Internet. In spite of these obvious trends toward e-insurance, the life insurance industry continues to trail the rest of the financial service sectors in implementation of meaningful Internet strategies.

The fractured and segmented nature of the life insurance industry is one factor that has kept it from realizing the Internet's full potential. The existing insurance industry model, as discussed, comprises four main tiers: company, general agency, agent and consumer. To further complicate matters, an agent may hire numerous sub-agents. For discussion purposes, the numerous sub-agents are included under the agent component rather than separately treated as another component. The insurance company creates and underwrites the policy and distributes it to the consumer directly or through an agent. In the formative days of the industry, when today's large companies were just getting started, agents were bound to a single company, or to general agencies that were bound to a single company. Today, however, the agent situation is entirely different. Eighty-five percent (85%) of all life insurance agents are independent and have no direct employment obligation to the insurance companies that contract with them. The independent agents usually affiliate themselves with an insurance company by executing an appointment contract through an agency known as a Managing General Agency (MGA), which is a marketing organization for both companies and agents. Independent agents can be and frequently are, appointed to several different insurance companies, and possibly through several competing MGA's.

Insurance companies rely upon MGA's to recruit agents that will sell their products. In turn, MGA's are paid a commission on the dollar volume that the contracted agents direct to the insurance company. MGA's have an incentive to maximize their commissions by directing their production to a few insurance companies, thus, focusing and limiting their selection of products. Agents generally act autonomously, writing for whom they please, promoting and representing products with little supervision, and collecting their commissions on whatever basis they can, sometimes directly from the company with which they are associated, at other times from the MGA's that appoint them.

Agents receive only fragmented information from each of the insurance companies with which they place business; i.e., they cannot obtain consolidated sales and commission transaction records, underwriting status reports, or customer service details. Agents must contact each insurance company individually and interact with its multiple administrative departments to keep track of the approval and commission status of the business they have written. Rather than these contacts being efficient and satisfying exchanges, they frequently lead to confusion and high levels of frustration. Agents as well as the managing general agencies are forced to keep their own set of records, in order to be able to respond to consumer questions, but this causes multiple data entry and duplicate record keeping. Agents find themselves forced to hire additional office staff merely to keep track of business relationships, client information, and income sources.

In the existing insurance industry, communications between agents and their clients is typically poor. Depending on their confidence in their agent, consumers are as likely to pick up the phone and contact the insurance company directly as they are to phone the agent. This bypasses the agent and denies them participation in the customer service process. Because most companies have difficulty fully accommodating just this type of random client request, the consumer may be dissatisfied with having called the company to get help with their question. Moreover, the agent and the MGA may be completely unaware of the dissatisfied consumer. Such a communication breakdown has a negative outcome for every party to the transaction.

Insurance company communication problems also extend to the multitude of policies, forms and procedures for which they are famous. Indeed, the distaste of the average citizen for financial instruments comprised of many pages of detailed contractual description is well known. And the public's insecurity in feeling that they should understand all the "fine print" leads to a reluctance to engage with the sales force and other staff responsible for creating, explaining, using and selling the products. And insurance contracts also vary by company and by state, since insurance regulation is carried out at the state, not federal, level. This results in each individual insurance company being forced to fashion different policies, forms and procedures to meet the requirements of local state regulatory commissions, even though the policy is the "same product" from the company's perspective.

In the current industry environment, no two participants in any means of communication are necessarily speaking the same business language nor receiving their information in a common format. No industrial forum exists for assembling disparate data into a shared system of exchange. The consequences are not only poor coordination between the several-to-many parties involved in sales and service, but also difficulty in acquiring records from any single source and making them available to the agent and consumer. Unlike other financial services providers, the insurance industry cannot readily supervise or direct the activities of its agents because they are so independent. The industry has fewer standardized education programs and experiences more difficulty in assuring that these training standards are enforced.

Insurance companies are reluctant to market directly to consumers for fear that their wholesale and retail distribution networks (the MGA's and the agents) will be disrupted, further weakening the connection between consumers and companies. Indeed, direct marketing to the public via television and the Internet may bypass some existing sales intermediaries, and some agents and agencies may not make the transition. However, personal contact between a consumer and an agent will remain an essential part of the sales and service cycle for the foreseeable future because of the sensitive nature of the financial relationship that life insurance represents.

With all the computing power originally concentrated in the companies in the formative early years, the insurance industry established transaction flows and communication modes specifically designed for its centrally managed top-down process. Most transactional communication from the company was directed to the managing agency and the agent, not the consumer. If anything important had to be conveyed to the consumer, an agent performed the role of messenger. If a consumer had questions, it was the agent who fielded them. With the advent of the personal computer, however, computing power has gradually grown within households to the point where the collective computing power contained in all the home computers and game stations would rival the computing power of a large corporation.

Intertwined with the issue of transactional exchange among industry components is the issue of control and authority by which some components make decisions within the scope of recognized legal authority and possess ownership over property in areas recognized by law. All components of the industry must agree on these fundamental issues of control, authority, and ownership in order for business to be transacted.

In current business models and practice, the company is the controlling source of all control, authority, and ownership, since it is companies who create, own, and underwrite the financial product, and who retain responsibility for administration following purchase of a product by consumers. This traditional hierarchy of power is a pyramid structure with the company at the top, and with the general agencies occupying the second tier from the top, agents at the third tier, and consumers at the base. In this model the consumer has no direct access to company information systems that maintain their private data (personal health data as well as financial data), and even agents can exercise only the data access afforded them by the general agency or the company.

With the advent of the global Internet, it has become apparent that information systems are quite easily constructed to maintain consumer data and at the same time provide access to the consumer who is the source of that data. This situation puts consumer data ownership and consumer data access on the same footing, as should be the case. The owner of a property should have a legal right to access that property, and to prevent others from accessing that property.

The industries that are profiting from the computer revolution now are those that have made the consumer an active player in the game of e-commerce. An early lesson learned by these companies is that customer support has to be immediate and extensive to respond to consumer questions and complaints. Also, systems must be designed to give maximal decision-making capability to the consumer when they are browsing an e-commerce site. The insurance industry is having a difficult time furnishing an equivalent empowering capability for its policyholders and potential customers. The question yet to be answered is how can the insurance industry profit from the tremendous networked computation capability now in the hands of consumers. How can the industry move to enable the consumer without also diluting their own ownership or disrupting their own top-down, corporation-centric established procedures and systems?

The inertia of proprietary legacy computer systems, combined with the competitiveness within the industry, has made it seemingly impossible to break out of the status quo transactional configuration. Industry programs for establishing standards for communication and information format would appear to be an advantage for all companies, in that they would eventually increase sales and profits. However, competitive pressure legislates that sharing standards across the industry is too risky to push ahead quickly. Likewise, an implicit goal of protecting proprietary systems leads companies to decide that new systems should not be constructed too quickly, less resources be pulled away from maintaining the old legacy systems. In any case, it is the companies working at the highest levels of their management who are failing in their attempts to reconfigure the industry.

A glaring fact that has emerged from various studies of the insurance industry is that none of the approaches currently at play in the insurance industry offer any new conceptual approaches by which the Internet can be harnessed to revitalize industry relationships in fresh and innovative ways. All of them merely seek to use the Internet technology as a way of leveraging current power hierarchies for strengthening already-existing industry relationships.

In addition, consumers are treated as merely the source of revenue, but given no expanded powers other than a newer way to provide a monetary stream via the Internet. Similarly, the agent is viewed from the point of view of a distribution model in which financial product is marketed and moved by means of agents, but agents are given no capability for enhancing their personal business interests in relation to agencies or carriers.

Thus, there is a considerable need in the insurance industry for the subject of the present invention, namely, a system, method, and business model that enhances communication and transactional processing between segments of the industry. Further, there is a great felt need to coordinate the insurance industry through global computerized networks to allow for universal forms and terminology, in order to make the insurance industry more accessible to the consumer via e-commerce. There is a need for a cross-company industry portal or platform that allows information from multiple insurance companies to reside in a place accessible by consumers, agents, and agencies on an as-needed basis, rather than as the result of company-designed transactions that are restrictive and limiting in their enablement of business.

SUMMARY OF THE INVENTION

In accordance with one feature of the invention, there is provided a shared insurance industry system for sharing information between insurance company, managing general insurance agency, insurance agent and the consumer. Such system includes a shared insurance industry database for storing insurance industry related information and a communications mechanism for transferring information to and from the shared insurance industry database. An insurance company mechanism is coupled to the communications mechanism for enabling an insurance company to transfer information to and from the shared insurance industry database. A managing general insurance agency mechanism is also coupled to the communications mechanism for enabling a managing general insurance agency to transfer information to and from the shared insurance industry database. Further coupled to the communications mechanism is an insurance agent mechanism for enabling an insurance agent to transfer information to and from the shared insurance industry database.

In accordance with another feature of the present invention, there is provided an Internet-enabled shared industry platform for enabling transactions and information transfers between different members of the insurance industry. Such shared industry platform includes a communications mechanism for coupling the shared industry platform to an Internet communications network. The shared industry platform also includes a data processing mechanism coupled to the communications mechanism for processing insurance industry member requests. Such platform further includes a plurality of insurance transaction mechanisms coupled to the data processing mechanism for executing various insurance-related business transactions. The shared industry platform also includes a data storage mechanism responsive to the insurance transaction mechanisms for storing data involved in the insurance-related business transactions.

For a better understanding of the present invention, together with other and further advantages and features thereof, reference is made to the following description taken in connection with the accompanying drawings, the scope of the invention being pointed out in the appended claims.

BRIEF DESCRIPTION OF THE DRAWINGS

Referring to the drawings:

FIG. 11 is a table showing the organization of a member database that may be located in the shared industry platform of FIG. 8;

FIG. 13 is a table showing the organization of a distribution database that may be located in the shared industry platform of FIG. 8;

FIG. 14 is a table showing the organization of a product database that may be located in the shared industry platform of FIG. 8;

FIG. 16 is a table showing the organization of an application database that may be used in connection with the application to purchase transaction of FIG. 15;

FIG. 18 is a table showing the organization of a sale database which may be located in the shared industry platform of FIG. 8 and which may be used in connection with a sale transaction like that shown in FIG. 17;

FIG. 20 is a table showing the organization of a commission database which may be used in connection with a commission transaction like that shown in FIG. 19;

FIG. 22 is a table showing the organization of a sales and commissions report database that may be located in the shared industry platform of FIG. 8;

FIG. 24 is a table showing the organization of a synchronizer database located in the shared industry platform for use with the data synchronizer mechanism of FIG. 23.

DETAILED DESCRIPTION OF THE ILLUSTRATED EMBODIMENTS

Figure 1:
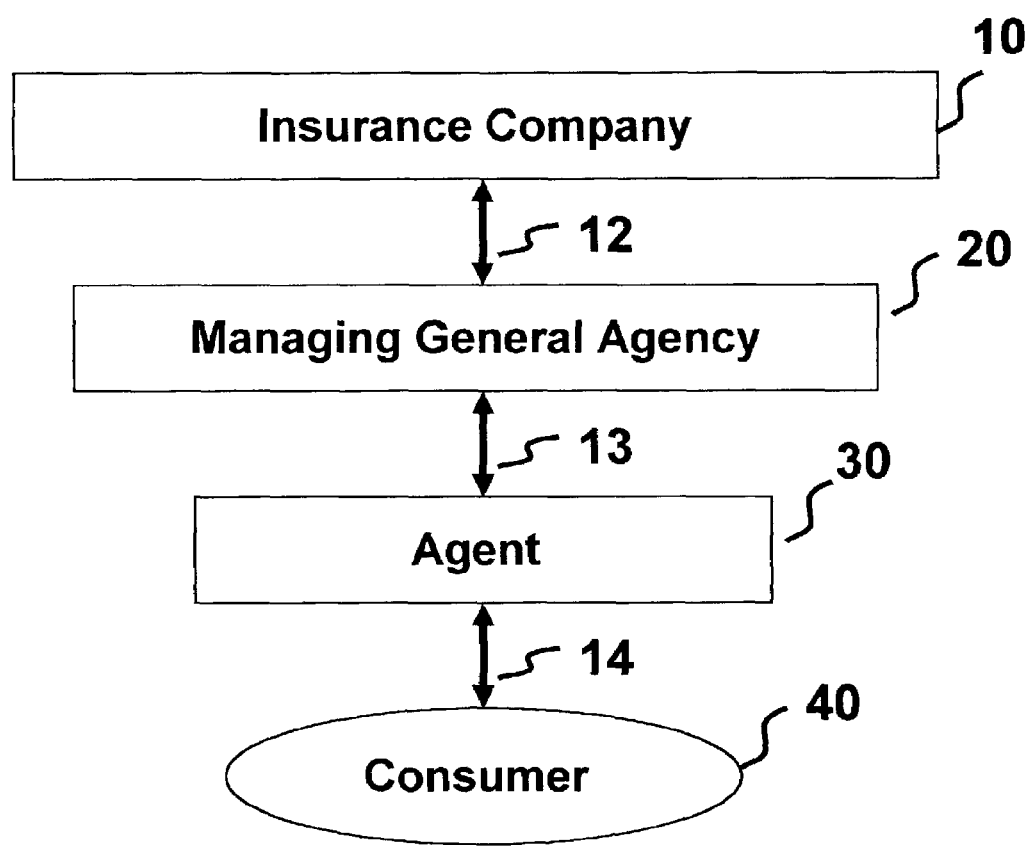
FIG. 1 is a block diagram representing the major elements in the insurance industry and their relationship to one another in a four tier hierarchal structure.

FIG. 1 shows the four interdependent components (also known as elements, tiers, or layers) of an insurance services industry. In particular, FIG. 1 represents all components that may be involved in development, sale, and purchase of an insurance product. An insurance company 10 develops, owns and underwrites the product, and distributes it through contract-bound wholesale distributors 20 (also known as brokers, agencies, or managing general agencies) who engage agents 30 to sell to consumers 40. During the sales and support cycle, communication is established and controlled primarily by each particular company, and secondarily by each particular distributor, and differs among individual companies and distributors.

The simplest and least flexible manner of communicating and transacting business is the idealized "strict hierarchy" depicted in FIG. 1, in which exactly three transaction/communication paths are permitted: path 12 between company 10 and general agency 20, path 13 between general agency 20 and agent 30, and path 14 between agent 30 and consumer 40. In this strict hierarchy business model, each component of the industry interfaces only with those adjacent to it in the hierarchy of company, general agency, agent, and consumer. Companies 10 interact only with their contracted general agencies 20 via path 12. General agencies 20 interact only with insurance companies 10 via path 12 or with agents 30 via path 13. Agents 30 interact only with general agencies 20 or with consumers 40, the latter via path 14. Consumers 40 have only the option of interacting with agents 30, which they must accomplish via communication path 14.

This industry model is simple in the sense that it has only three possible communication paths for transacting all business, which facilitates a corresponding direct and tight management control of business transaction flow. This simplicity is also the cause of much difficulty and inflexibility in communication, however, since it prevents direct communication between components separated from each other by intervening layers of the hierarchy. For example, information from a company targeted to the agent must be passed to the general agency, from whence it is passed on to the agent, and vice versa. Information from a company to the consumer must pass through the general agency and the agent, and so forth. Each transferal of a communication through an intermediary increases transit time and creates a potential for bottleneck and loss of information. The strict hierarchy is inflexible because its structure restricts communication and business activity to flow within the three authorized and supported transaction paths that connect components.

Figure 2:
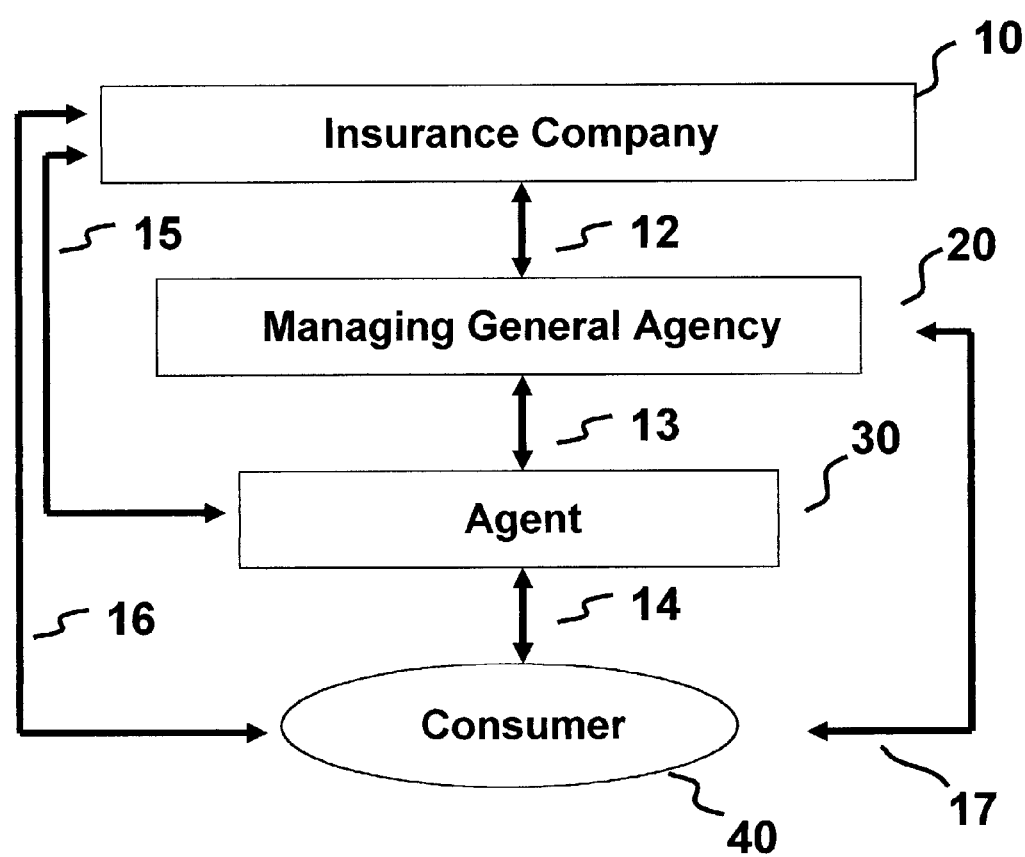
FIG. 2 is a modified version of FIG. 1 showing additional level-jumping communication paths that have developed in the insurance industry.

The insurance industry has progressed beyond this strict hierarchy. The current state of affairs is better depicted in FIG. 2 and is sometimes referred to as an "extended hierarchy". As shown in FIG. 2, three new communication paths 15, 16 and 17 are added to the "strict hierarchy" model of FIG. 1. Path 15 allows the insurance company 10 to interact directly with the agent 30. Path 16 allows the insurance company 10 to interact directly with the consumer 40. Path 17 allows the general agency 20 to interact directly with the consumer 40. This industry model is a realistic reflection of real-world processing, and will be described as the extended hierarchy business model because the number and type of industry components is unchanged but the communication paths connecting the hierarchy levels are extended to the maximum number possible. There are no other possible component-to-component communication paths among four industry elements than those shown in FIG. 2.

Figure 3:
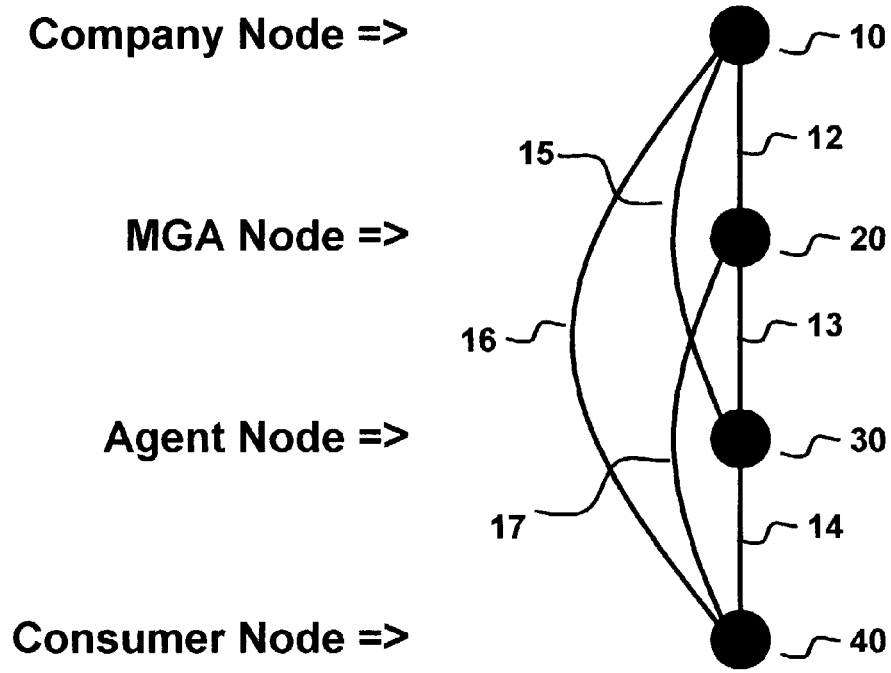
FIG. 3 is a graph of the FIG. 2 structure, with the industry elements represented as nodes and the transactional communication paths represented by lines connecting the nodes.

A mathematical graph representation of the extended hierarchy business model of FIG. 2 is shown in FIG. 3, wherein industry components are again represented by four graphical nodes: companies by node 10, general agencies by node 20, agents by node 30, and consumers by node 40. Permitted communication paths are now six in number, represented as the prior three graphical lines 12, 13 and 14 of the strict hierarchy, plus an additional three lines 15, 16 and 17 that represent the new possibilities for communication and transactional flow. The extended company/agent transaction path is represented by curved line 15, the extended company/consumer path by curved line 16, and the extended general agency/consumer path by curved line 17. The mathematical model of FIG. 3 captures the essence of the extended hierarchy business model.

Figure 4:
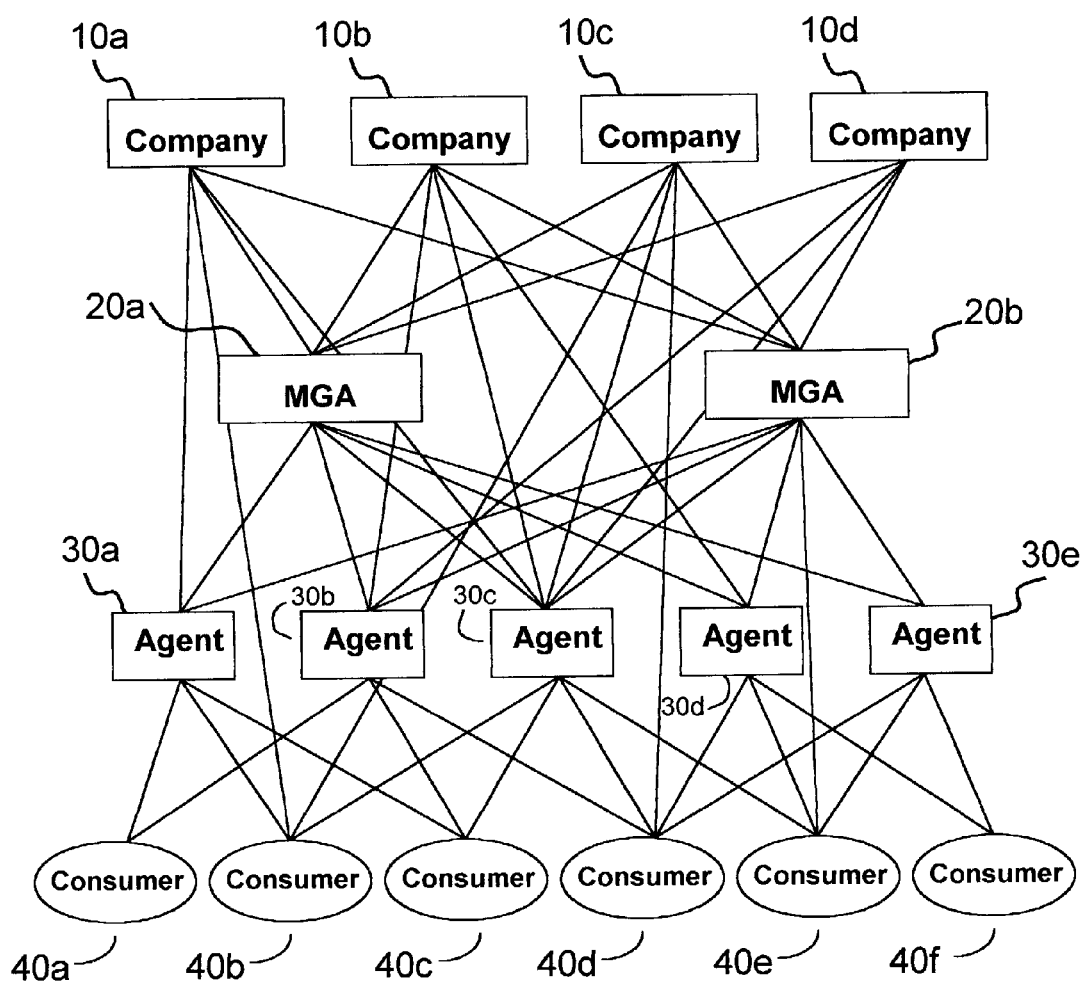
FIG. 4 is a block diagram showing representative modern-day insurance industry relationships involving multiple insurance companies, multiple managing general agencies (MGA's), multiple insurance agents and multiple consumers.

FIG. 4 is a block diagram showing representative modern-day insurance industry relationships involving multiple insurance companies 10a-10d, multiple managing general agencies (MGA's) 20a and 20b, multiple insurance agents 30a-30e and multiple consumers 40a-40f. As indicated in FIG. 4, interactions among components of the present-day insurance industry are more complex, and more interesting, than those of the idealized strict hierarchy of FIG. 1. As shown in FIG. 4, there are multiple channels of communication between the various components, with a resulting communications system that resembles a spider web and is anything but simple. In this scenario, a consumer 40d, in order to obtain information about a financial product from a company 10c, may make a request directly to the company 10c or lodge it with an agent 30c. Furthermore, once the product is in force, documents and other information may be forwarded directly from the company 10c to the consumer 40d. Further, each company may communicate with the various general agencies regarding products available and other contracting information. Each general agency, in turn, communicates with various agents in order to market the products. It is often necessary that an agent (e.g., 30a) communicate both with the general agency (e.g., 20a) and with the company (e.g., 10a). Also, in certain instances a consumer (e.g., 40e) may communicate directly with a general agency (e.g., 20b).

Contractual relationships also are part of the same configuration of transactional paths. A company 10b may sell products through a number of general agencies 20a and 20b with which it has contractual relationships, and may additionally contract directly with agents 30c and 30d. A general agency 20a may typically be enabled by contract to market and sell products from several different companies 10a-10d, and will have multiple agents 30a-30e under contract. The agent may work directly for one or more companies, or may sell for multiple general agencies without having a relationship with any company, or may be totally independent and sell for any company and any general agency, depending on the product. And, of course, a single agent will typically have hundreds of consumers as clients, from whose purchases the agent will receive sales commissions. There will be communications and transactional flows related to each of these relationships, and they will jump levels of the industry as required.

The present invention provides a system, method, and business model that unifies transactional processing for all components of the insurance industry by means of a network-based computer system that implements software and databases accessible by anyone in the industry. A shared industry platform implements interaction between industry components by means of software that controls business applications and their distribution across components. Each component is allowed access to the appropriate financial transaction data and sensitive business information appropriate for their business relationships.

In this patent application, the term "transaction" and the phrase "transactional path" are used in the very broad business sense of denoting any exchange of data or information in any form, whether electronic or not, that occurs between any two system elements, with system element taken to mean any company, general agency, agent, consumer, or the shared industry platform of the present invention, or any electronic or manual system, subsystem, or procedure in use by any company, general agency, agent, consumer, or the shared industry platform of the present invention to carry out the business intent of the company, general agency, agent, consumer, or the shared industry platform of the present invention. Thus "transaction" includes but is not limited to the narrow sense of data packet exchange between computer client/server partners or other distributed computer sender/receiver pairs in a data exchange.

Figure 5:
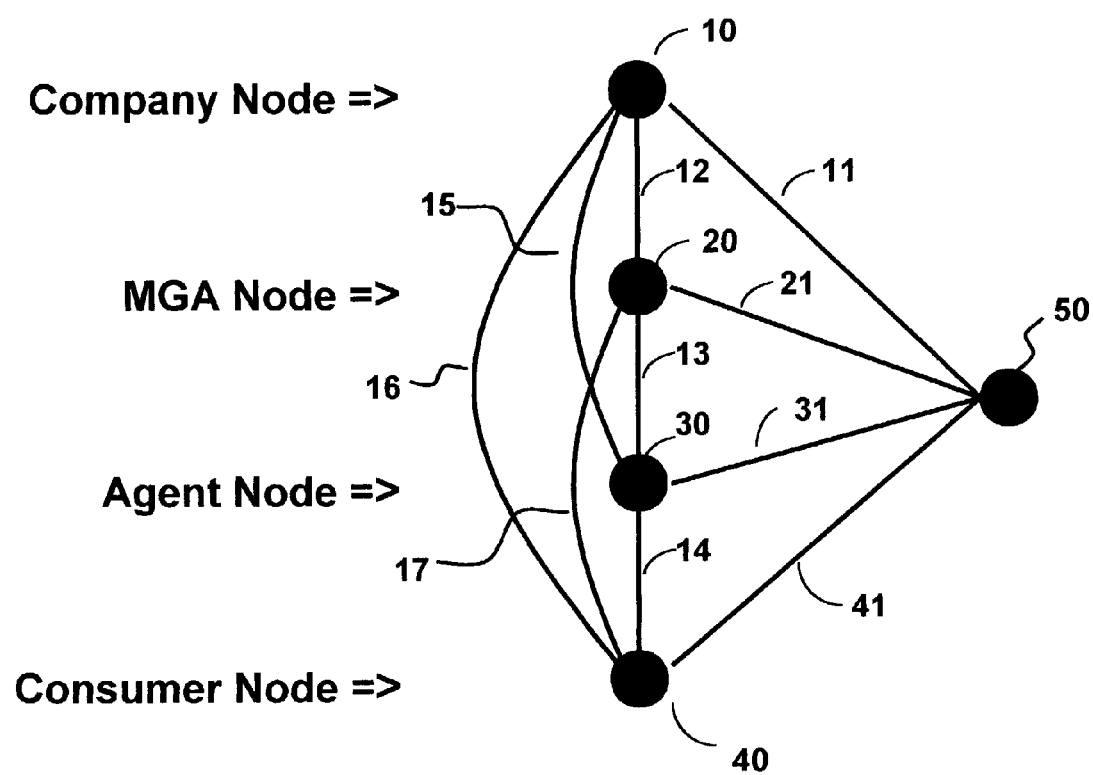
FIG. 5 is a graph similar to FIG. 3 and further including a shared industry platform in accordance with the present invention.

A mathematical graph representing the present invention is shown in FIG. 5, in which each component of the industry and each gross element of the system of the present invention is represented by a distinct mathematical entity on a five-node graph with ten interconnecting lines. Currently in-place industry components are represented by graphical nodes 10, 20, 30 and 40. The insurance companies map to node 10, the general agencies (MGA's) map to node 20, the insurance agents map to node 30, and consumers map to node 40. A new and novel element, a shared insurance industry platform, maps to node 50. Currently in-place industry transactional paths map to line 12 for company/general agency, line 13 for general agency/agent, line 14 for agent/consumer, line 15 for company/agent, line 16 for company/consumer, and line 17 for general agency/consumer.

Four new and novel transactional paths, also part of the present invention, are path 11 linking companies 10 to the shared industry platform 50, path 21 linking general agencies 20 to the shared industry platform 50, path 31 linking agents 30 to the shared industry platform 50, and path 41 linking consumers 40 to the shared industry platform 50. Each of the new transactional paths 11, 21, 31, and 41 represents any and all one-way or two-way transactional and communicative interactions that might be implemented between an industry element 10, 20, 30 or 40 and the unique and singular shared industry platform 50. Path 11 represents all potential interactions between a company 10 and the shared industry platform 50, path 21 represents all potential interactions between a general agency 20 and the shared industry platform 50, path 31 represents all potential interactions between an agent 30 and the shared industry platform 50, and path 41 represents all potential interactions between a consumer 40 and the shared industry platform 50.

The new transactional paths 11, 21, 31, and 41 and the new shared industry platform 50 of the present invention provide a global network enablement of the insurance industry, in which each and every industry component can communicate and exchange data and information with each and every other component, no matter what previously-existing hierarchical paths (e.g., 12-17) might or might not exist, and no matter what business rules might or might not hold in the previously-existing hierarchy for controlling industry communication and exchange. The mathematical model of FIG. 5 represents the essence of the system of the present invention and differentiates such system and invention from the currently existing business models that currently represent the insurance industry.

Figure 6:
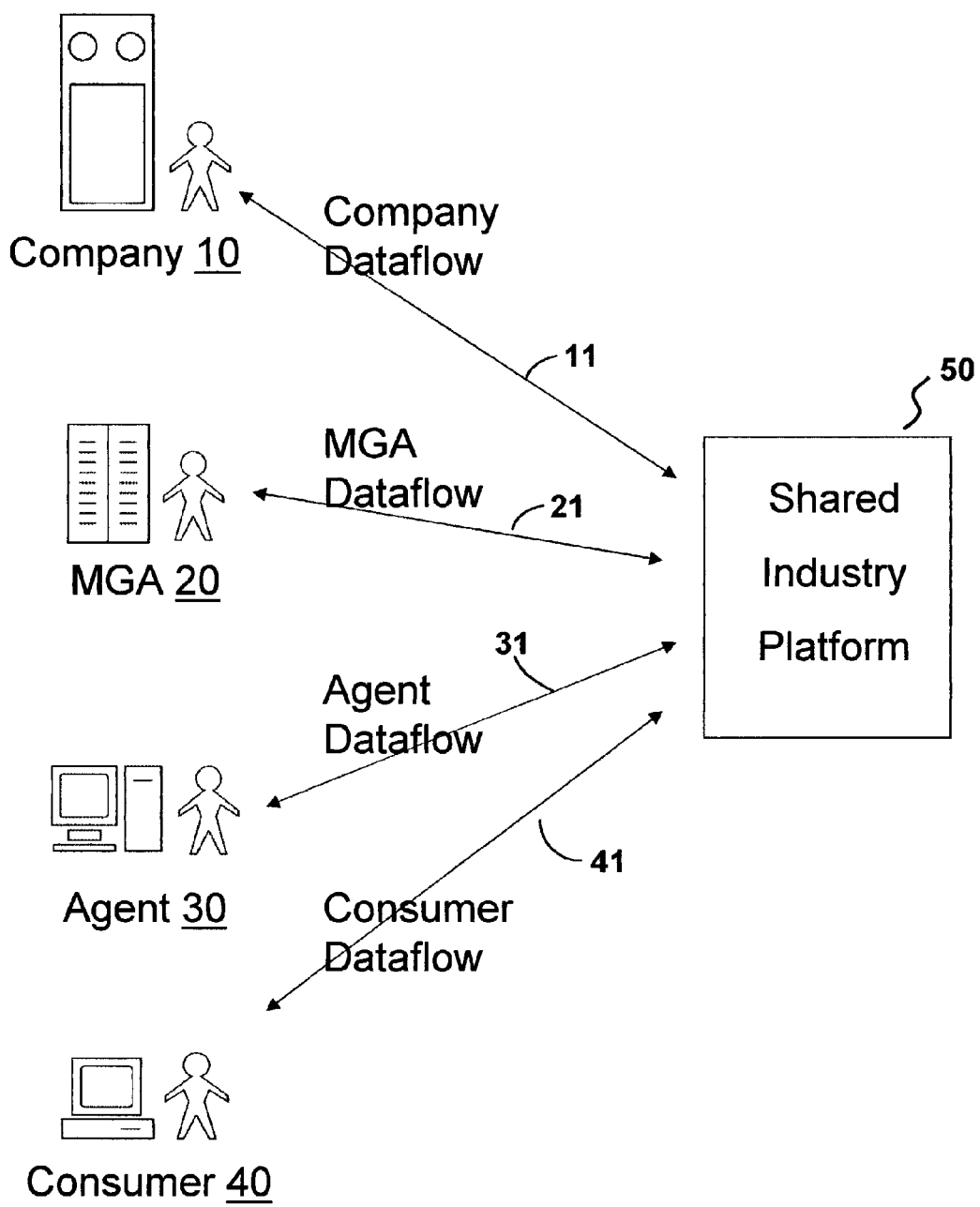
FIG. 6 is a high-level representation of the data flows into and out of a shared industry platform in accordance with the present invention.

FIG. 6 is a high-level pictorial representation of the various data flows into and out of the shared industry platform 50. The following considerations are applicable to transactional exchanges between companies 10 and the shared industry platform 50 via company dataflow path 11. Company computers including mainframes and other departmental computers and servers should be connected by internal networks that are highly secured to prevent outside access to the machines and their file systems. Both the industry platform 50 and the company/platform transactional path 11 should be highly secure to prevent interception of any communication by outside parties. Company data chosen to reside on the industry platform represents company information to be shared with one or more general agencies, agents, and consumers according to company-established permission rules. Scheduled batch processes (monthly, weekly, nightly) typically extract large amounts of data from the company computers and load or synchronize that data into industry platform databases so that the data is appropriately available via the industry platform to appropriate distributors, agents, and consumers. A scheduled batch synchronization program typically compares data on company databases with data on the industry platform databases and performs update operations to effect agreement between the company databases and the industry platform databases.

Transactional flows may exchange data in small, discrete amounts in response to transactional processes initiated by the company, the general agency, the agent, or the consumer. Query transactions may move data in either direction along a transactional path to satisfy requests to read data at one element and display it on terminals connected to another element. Company data access at the shared industry platform and/or exchange along transactional path 11 always takes place under the explicit operational control of a permissions software layer embedded in the shared industry platform 50, whose rules define which individual or element has read or update privilege to which data, thus defining the exact structure of the many plural business relationships that exist between company, general agency, agent, and consumer.

The following considerations are applicable to transactional exchanges between managing general agencies 20 and the shared industry platform 50 via MGA dataflow path 21. General agency computers primarily include departmental computers and servers connected by internal networks that are secured to prevent outside access. Both the industry platform 50 and the general agency transactional path 21 are secured to prevent interception of any communication by outside parties. General agency data chosen to reside on the shared industry platform 50 represents general agency information to be shared with one or more companies, agents, and consumers. Scheduled batch processes (monthly, weekly, nightly) typically extract data from general agency computers and load or synchronize that data into the industry platform databases so that the data is appropriately available up and down the hierarchy to the appropriate company staff, agents, and consumers. Scheduled batch synchronization programs compare data on general agency databases with data on the industry platform databases and perform update operations to effect agreement between the general agency databases and the industry platform databases.

Transaction flows exchange data in small, discrete amounts in response to transactional processes initiated by the company, the general agency, the agent, or the consumer. Query transactions move data in either direction along the transactional path 21 to satisfy requests to read data at one element and display it on terminals connected to another element. General agency data access at the industry platform 50 and/or exchange along transactional path 21 always takes place under the explicit operational control of a permissions software layer embedded in the industry platform 50, whose rules define which individual or element has read or update privilege to which data, thus defining the exact structure of the many plural business relationships that exist between company, general agency, agent, and consumer.

The following considerations are applicable to transactional exchanges between agents 30 and the shared industry platform 50 via agent dataflow path 31. Agent computers primarily include server computers connected by an internal local area network that is secured to prevent outside access. Both the industry platform 50 and the agent communication path 31 are secured to prevent interception of any communication by outside parties. Data chosen by an agent to reside on the industry platform represents agent information to be shared with one or more companies, MGA's, and consumers. Scheduled batch processes (monthly, weekly, nightly) extract data from the agent computers and load or synchronize that data into industry platform databases so that the data is appropriately available up and down the hierarchy to the appropriate insurance companies, MGA's, and consumers. A batch synchronization program on the industry platform compares data on agent databases with data on the industry platform databases and perform update operations to effect agreement between the agent databases and the industry platform databases.

Transaction data flows exchange data in small discrete amounts in response to transactional processes initiated by the company, the agency, the agent, or the consumer. Query transactions move data in either direction along transactional path 31 to satisfy requests to read data at one element and display it on terminals connected to another element. Agent data access at the industry platform 50 and/or exchanges along transactional path 31 always takes place under the explicit operational control of a permissions software layer embedded in the industry platform 50, whose rules define which individual or element has read or update privilege to which data, thus defining the exact structure of the many plural business relationships that exist between company, general agency, agent, and consumer.

The following considerations are applicable to transactional exchanges between consumers 40 and the shared industry platform 50 via consumer dataflow path 41. Consumer computers typically include a desktop computer connected by means of a dial-up connection to an Internet Service Provider (ISP) who provides Internet connectivity for both the page-oriented HTTP protocol as well as the file-oriented FTP protocol. Consumer computers may also include any number of portable devices capable of wireless network access to the Internet. Both the industry platform 50 and the consumer transactional paths 41 are secured to prevent interception of any communication by outside parties. Data chosen by a consumer 40 to reside on the industry platform 50 represents that consumer's personal, private information to be shared with one or more companies, general agencies, and agents. Scheduled batch processes are unlikely for the consumer computer, however, consumer downloads of data and information files on an ad hoc basis are expected.

Transaction flows exchange small, discrete amounts of data in response to transactional processes initiated by the company, the distributor, the agent, or the consumer. Query transactions move data from the industry platform 50 to the consumer 40 to satisfy consumer requests. Consumer 40 data access at the industry platform 50 and/or exchanges along transactional path 41 always takes place under the explicit operational control of a permissions software layer embedded in the industry platform 50, whose rules define which individual or element has read or update privilege to which data, thus defining the exact structure of the many plural business relationships that exist between company, distributor, agent, and consumer.

FIG. 6 emphasizes that the shared insurance industry platform 50 is fundamentally a means for providing new and novel combinations of information exchange within the insurance industry for the purpose of enhancing the ease by which business is transacted. The company dataflow path 11 enables new ways for companies to share data with lower levels in the sales distribution hierarchy, down to and including agents and consumers. Likewise companies will gain insight into consumer questions about insurance products and will learn more about what makes a product attractive to consumers. The managing general agency dataflow path 21 will enrich all levels of the industry with new information about the effectiveness of sales recruiting techniques. The agent dataflow path 31 will give the industry new insight into the manner in which sales are transacted using new network-enabled portable computing tools. The consumer dataflow 41 will give consumers a chance to gain real insight and understanding into the financial underpinnings of the products that they consider essential, as well as immediate knowledge into the status of their financial assets. And, finally, the industry as a whole will benefit from the entirely new interactivity of the shared industry platform 50 that allows all components to transact business with increased speed and levels of detail.

Figure 7:
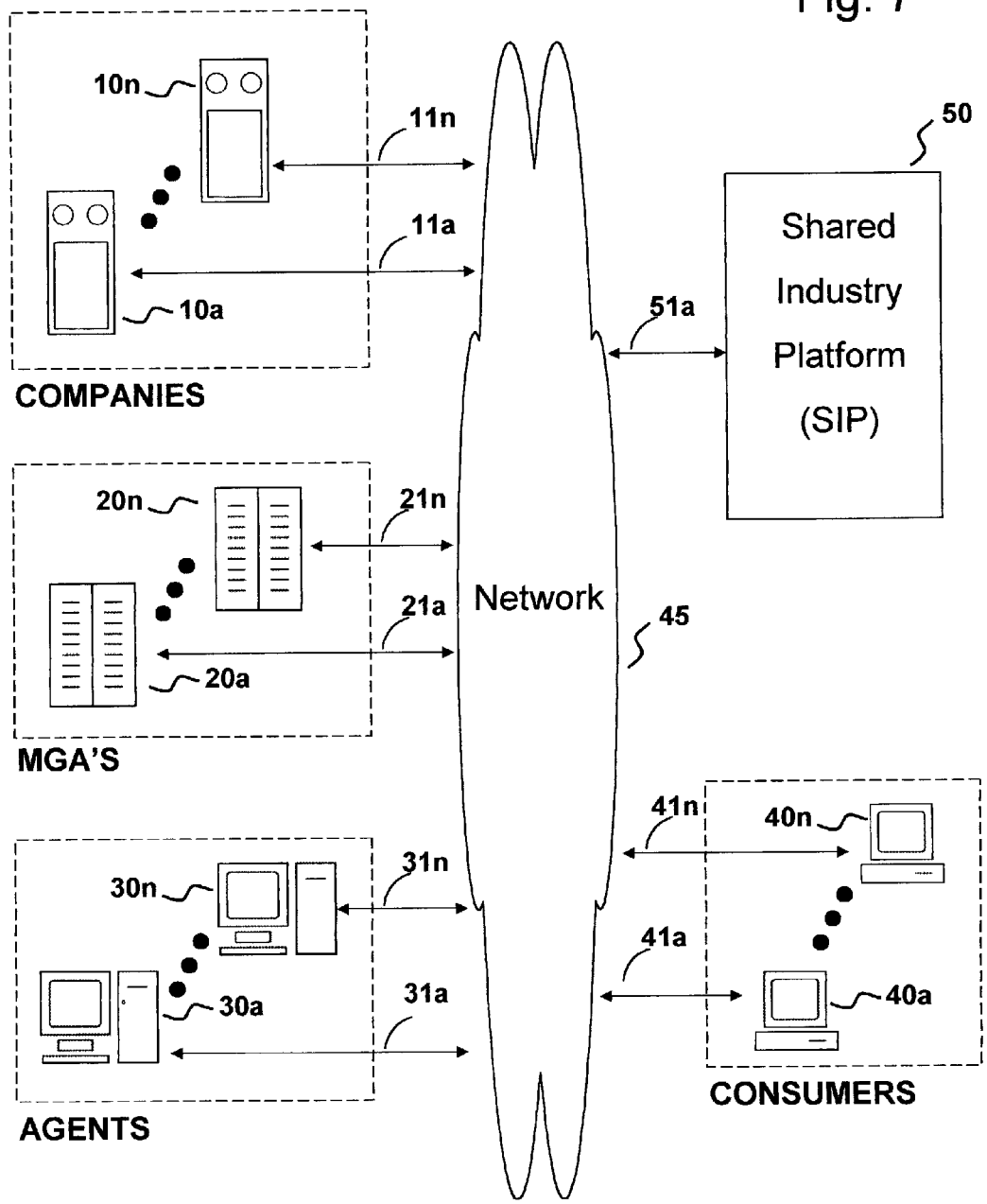
FIG. 7 is a high-level pictorial drawing of a representative embodiment of a shared insurance industry system constructed in accordance with the present invention for sharing information between insurance companies, managing general insurance agencies, insurance agents and consumers.

FIG. 7 shows a schematic diagram of an embodiment of a shared industry system constructed in accordance with the present invention for sharing information between insurance company, managing general insurance agency, insurance agent and consumer members of the insurance industry. The system includes a shared insurance industry database located on the shared industry platform 50 for storing insurance industry related information. The system further includes a communications mechanism for transferring information to and from the shared insurance industry database. In the present embodiment, this communications mechanism is a global computer network 45 which may take the form of, for example, an Internet communications network. The system also includes at least one insurance company mechanism coupled to the communications mechanism 45 for enabling an insurance company to transfer information to and from the shared insurance industry database on platform 50. A plurality of such mechanisms are represented in FIG. 7 by insurance company computers 10a-10n.

The system of FIG. 7 further includes at least one managing general insurance agency mechanism coupled to the communications mechanism 45 for enabling a managing general insurance agency to transfer information to and from the shared insurance industry database on platform 50. A plurality of such mechanisms are represented in FIG. 7 by managing general agency computers 20a-20n.

The system of FIG. 7 also includes at least one insurance agent mechanism coupled to the communications mechanism 45 for enabling an insurance agent to transfer information to and from the shared insurance industry database on platform 50. A plurality of such mechanisms are represented in FIG. 7 by agent computers 30a-30n.

The system of FIG. 7 further includes at least one insurance consumer mechanism coupled to the communications mechanism 45 for enabling an insurance consumer to transfer information to and from the shared insurance industry database located on platform 50. A plurality of such mechanisms are represented in FIG. 7 by consumer computers 40a-40n.

As seen from FIG. 7, a plurality of company computers 10a-10n, a plurality of general agency computers 20a-20n, a plurality of agent computers 30a-30n, and a plurality of consumer computers 40a-40n can access the shared industry platform 50, which is a proprietary and essential component of the present invention, by way of the network 45. The shared industry platform 50 includes a digital network path 51a which connects the shared industry platform 50 to the multiple digital network paths 11a-11n, 21a-21n, 31a-31n and 41a-41n and thereby to the insurance companies 10a-10n, MGA's 20a-20n, agents 30a-30n, and consumers 40a-40n of the insurance industry. The shared industry platform 50 is comprised of a communication capability, security software, application software, and databases. Platform 50 provides interactive communication between each of multiple company computers, multiple agency computers, multiple agent computers, and multiple consumer computers. The shared industry platform 50 allows different levels of data access, depending on authorization rules embedded in its software and databases. Multiple company computers, multiple general agency computers, multiple insurance agent computers, and multiple consumer computers can simultaneously access the shared industry platform 50 through the global network 45, in the sense of "simultaneous" referring to computer operating system multi-tasking and scheduling processes in distributed computing platforms.

The detailed description set forth below is intended as a description of the presently preferred embodiment of the invention, and is not intended to represent the only form in which the invention may be constructed or utilized. The description sets forth functions and sequences of steps for constructing and operating the invention in connection with the illustrated embodiment. It is understood, however, that the same or equivalent functions and sequences may be accomplished by different embodiments and that those alternative embodiments are also intended to be included within the spirit and scope of this invention. Such disparate embodiments of the architecture of the present invention should not obscure the fact that the present invention represents a new and novel system, method and model for conducting insurance industry business by means of a network-connected shared industry computing system executing a collection of participating transactional processes.

In FIG. 7, the computers 10a-10n connected to the network 45 via digital network pathways 11a-11n, respectively, and thereby to the shared industry platform 50, via digital network passageway 51a, represent insurance company computers that perform corporate business processing for the multiple participating insurance companies (numbered "a" through "n") whose insurance products are distributed via a sales force. For sake of example, the insurance companies may be assumed to be life insurance companies and the insurance products may be assumed to be life insurance policies and annuities.

Any company, general agency, agent, or consumer using the Shared Industry Platform (SIP) is said to be "participating" in the SIP. Likewise, any insurance product being distributed by means of the SIP is said to be a "participating" product. Similarly, any business functions and interchanges being transacted via the SIP are said to be "participating" transactions and interchanges.

The MGA computers 20*a*-20*n* connected to the network 45 via digital network pathways 21*a*-21*n*, respectively, and thereby to the SIP 50, via digital network path 51*a*, represent the computers that perform business processing for the multiple participating managing general agencies that recruit and contract with sales agents for the purpose of selling insurance products. For sake of example, a life insurance Managing General Agency (MGA) may be considered as representative of a general agency.

The agent computers 30*a*-30*n* connected to the network 45 via digital network pathways 31*a*-31*n*, respectively, and thereby to the SIP 50, via digital network path 51*a*, represent the computers that perform business processing for the multiple participating agents whose role is to contact consumers and sell insurance products and insurance services to them. For sake of example, a life insurance agent is representative of the general sales force agent.

The consumer computers 40*a*-40*n* connected to the network 45 via digital network pathways 41*a*-41*n*, respectively, and thereby to the SIP 50, via digital network path 51*a*, represent the computers that perform personal processing for the multiple participating consumers that use the SIP for personal financial advice and service, as well as for executing specific participating transactions by means of the SIP 50. For the purpose of this embodiment, the general consumer is exemplified by a person possessing a personal computer with a web browser, with which the person can execute any of the World Wide Web applications available on the Internet.

For purposes of data security, the shared industry platform 50 will set up a Virtual Private Network (VPN) with each company, agency, agent and consumer. This is a secure, encrypted communication pathway utilizing the Internet that acts like a private communications network between the two parties. The information connection and exchange for transactions will use the party-to-SIP VPN. Both file transfer protocol (FTP) and hypertext transfer protocol (HTTP) can be used over the VPN.

Figure 8:
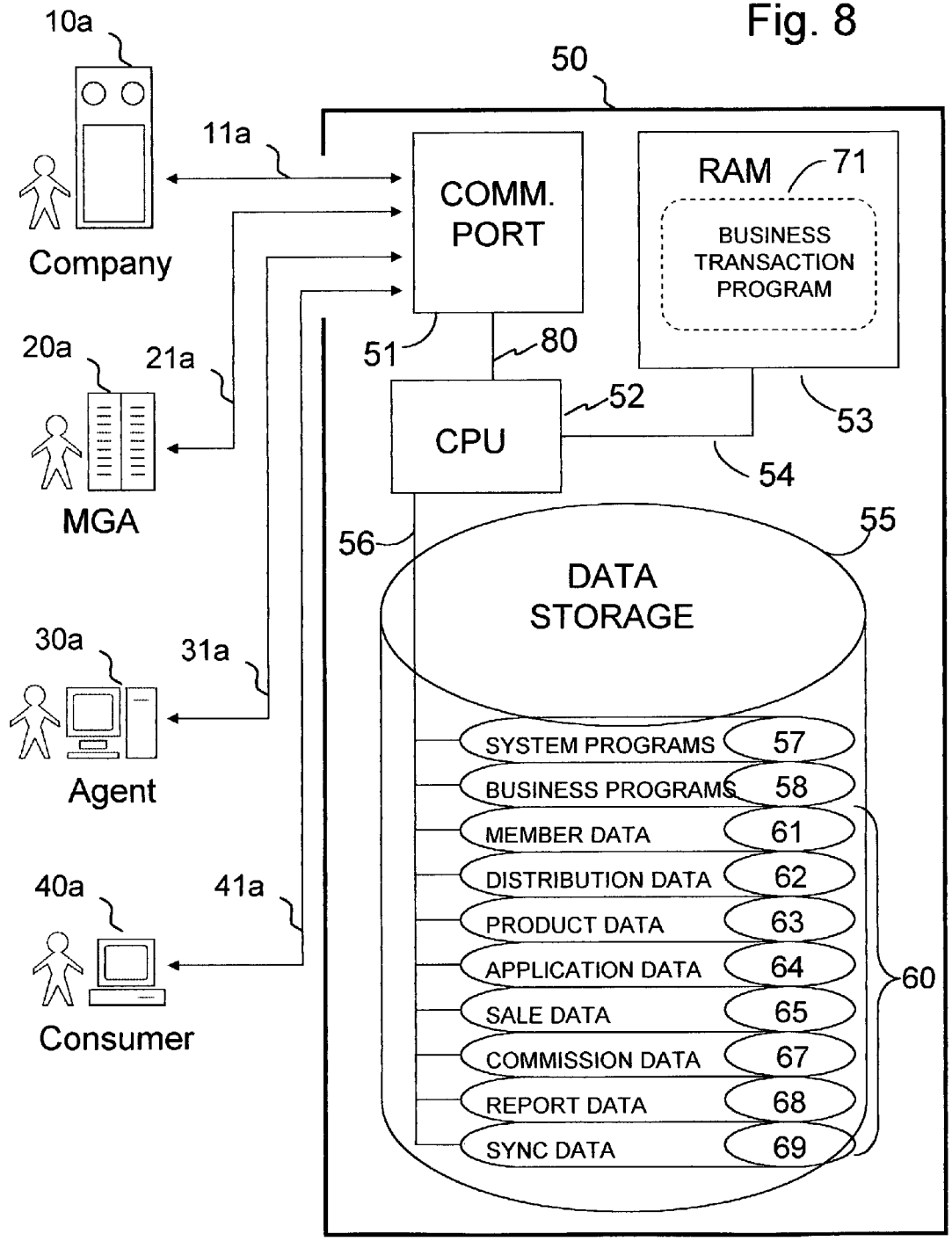
FIG. 8 is a block diagram showing in greater detail the internal construction of a representative shared industry platform constructed in accordance with the present invention.

FIG. 8 is a block diagram showing in greater detail the internal construction of a representative embodiment of shared industry platform (SIP) 50 constructed in accordance with the present invention. FIG. 8 shows a computing platform 50 that exemplifies the preferred embodiment of the shared industry platform as a single computer, although alternate embodiments can realize the computing platform as a plurality of computers networked together to provide substantially the same functionality. The shared industry platform 50 includes a communications port 51 which connects the shared industry platform 50 to the multiple digital network paths 11*a*-11*n*, 21*a*-21*n*, 31*a*-31*n* and 41*a*-41*n* and thereby to the insurance companies 10*a*-10*n*, MGA's 20*a*-20*n*, agents 30*a*-30*n*, and consumers 40*a*-40*n* of the insurance industry. For sake of simplicity, only company 10*a*, MGA 20*a*, agent 30*a*, consumer 40*a* and network paths 11*a*, 21*a*, 31*a* and 41*a* are shown in FIG. 8.

Shared industry platform 50 further includes a data processing mechanism coupled to the communications mechanism 51 via an input/output bus 80 for processing insurance industry member requests. This data processing mechanism includes a central processing unit (CPU) 52, a random access memory (RAM) 53 coupled to CPU 52 by way of a processor bus 54, and a data storage mechanism 55 coupled to CPU 52 by way of a storage bus 56. CPU 52, RAM 53 and data storage 55 together provide the processing, memory, and storage functions required by the shared industry platform 50.

The data storage unit 55 may take the form of one or more direct access storage devices or computer hard drives in a variety of configurations. Such data storage unit 55 includes three primary classes of stored files: system programs 57, business transaction programs 58, and multiple business databases 60. The system programs 57 include operating system programs that provide the fundamental computing capability of every computer, networking programs that provide network connectivity, and database management programs that provide the means by which massive amounts of data can be stored, retrieved, and manipulated by the CPU 52. Such system software is readily available in the commercial marketplace in a variety of implementations for computers of most any size and computing power, be they mainframes or personal computers.

The business transaction programs 58 include a number of computer programs that provide the business processing for transactions that participate in the shared industry platform 50. These business programs are unique to the shared industry platform and are custom developed to provide business functionality as required by the participating companies. They will be discussed in greater detail hereinafter.

The contents of the business information databases 60 comprises the operating property of the companies that transact business by means of the shared industry platform. This data is owned by and proprietary to each individual company that provides the data to the SIP, and the SIP implements a means by which the privacy of data is secured so that only the owning company and its authorized representatives have access to the data. In the example of FIG. 8, some eight different databases are provided. These include a member database 61, a distribution database 62, a product database 63, an application database 64, a sale database 65, a commission database 67, a report database 68 and a data synchronizer database 69. Each of these databases 61-69 is provided by a unique and different portion of the shared industry database 60 and each is assigned for storing data involved in a different one of the business transactions performed by the business transaction programs 58.

Figure 9:
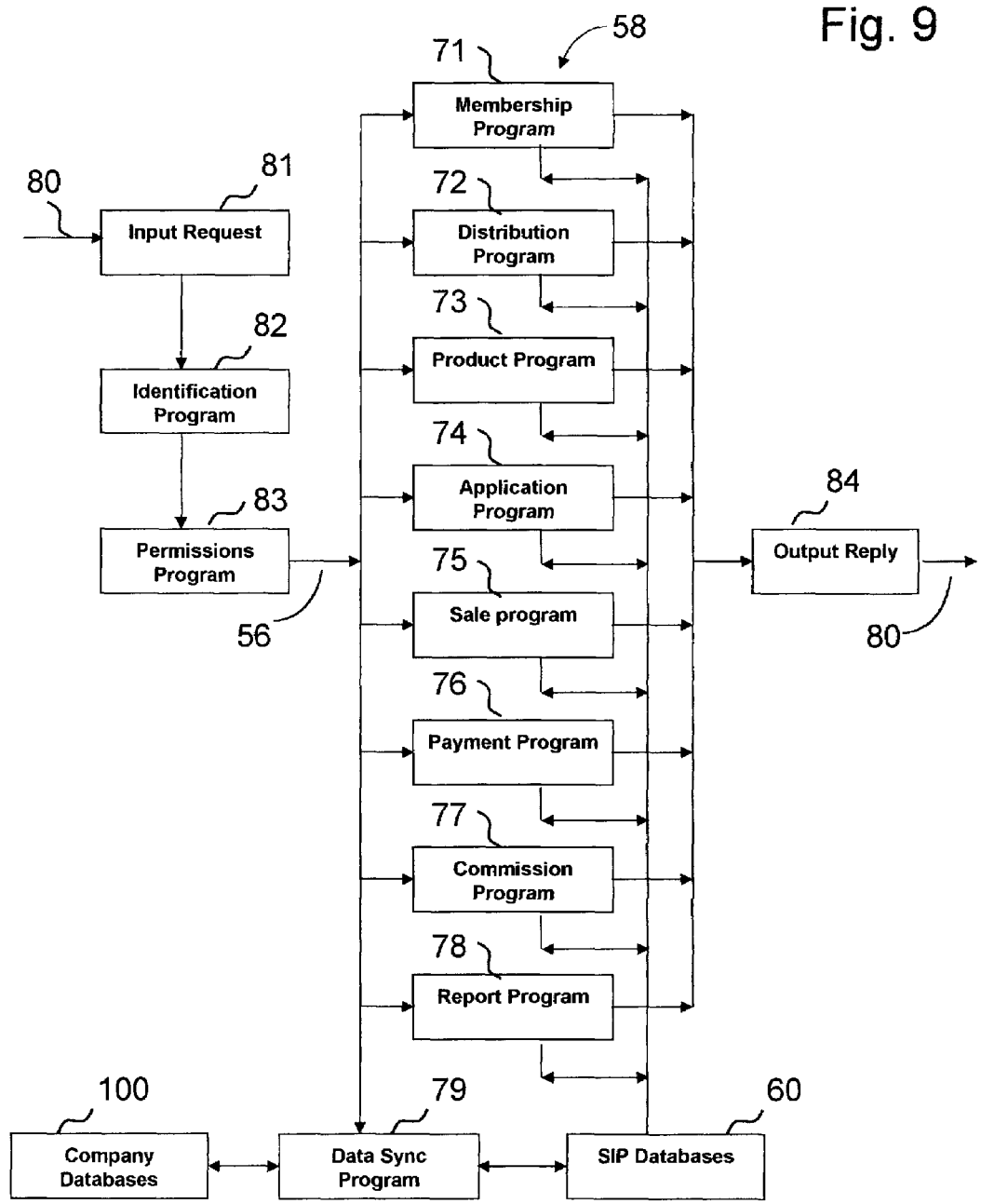
FIG. 9 is a block diagram showing the interrelationship of various computer software programs that may be used in the shared industry platform of FIG. 8.

FIG. 9 is a block diagram showing the interrelationship of various computer software programs that may be used in the shared industry platform 50 of FIG. 8. As indicated in FIG. 9, the business transaction programs 58 may include a membership program 71, a distribution program 72, a product program 73, an application program 74, a sale program 75, a payment program 76, a commission program 77, a report program 78 and a data synchronizer program 79. Input to and output from the computer software programs corresponds to the input/output bus 80 of FIG. 8. In addition, the programs can access data from the SIP databases 60, and synchronize data, with company databases 100 via the data sync program 79. These programs are stored in the data storage unit 55 in the business programs section thereof. The CPU 52 accesses the appropriate one of these programs and loads it into RAM 53 in order to run the corresponding business transaction. As an example, the membership program 71 is shown as residing in RAM 53 in FIG. 8.

The shared industry platform 50 includes a communications mechanism for coupling the SIP 50 to the Internet communications network 45. In the FIG. 8 embodiment, this communications mechanism includes the communications port 51. This port 51 is coupled to CPU 52 by CPU input/output bus 80.

The shared industry platform 50 further includes a data processing mechanism coupled to the communications mechanism 51 for processing insurance industry member requests. This data processing mechanism includes the CPU 52 and various data processing programs residing in the data storage unit 55. As indicated in FIG. 9, a member request is received by an input request circuit 81 and supplied to an identification program 82 for verifying the member identification code embedded in the request. If the identification code is valid, the request is passed on to permissions program software 83 which validates the various actions permitted for the received member request. If a requested action is permitted, an appropriate command is transmitted by way of storage bus 56 to make active one of the business transaction programs 71-79. The selected business transaction program is activated by loading it into RAM 53. The activated business program is executed by CPU 52 and the results are supplied to an output reply circuit 84 for transmission back to the requesting member via communications port 51 and the Internet network 45. Data involved in the executed business transaction is stored into the appropriate one of the business transaction databases 60 (databases 61-69 of FIG. 8).

Figure 10:
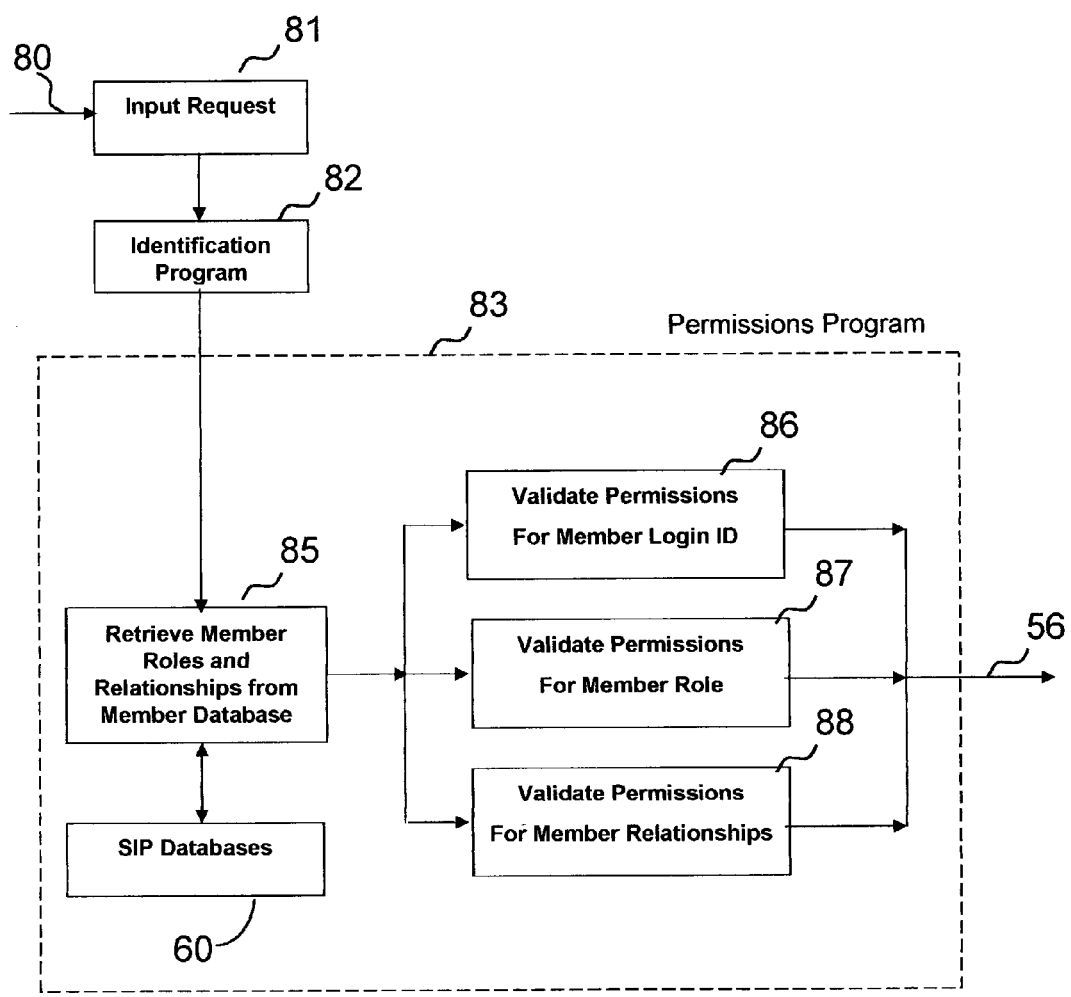
FIG. 10 shows in greater detail a representative form of construction for a permissions program used in FIG. 9.

FIG. 10 shows in greater detail a representative form of construction for the permissions program 83 of FIG. 9. The permissions program 83 of FIG. 10 includes a retrieval mechanism 85 for retrieving member role and member relationship information from the member database 61 and the distribution database 62 in data storage unit 55. This information is used by validation mechanisms 86, 87 and 88 to validate appropriate permitted actions for the received member request. Validation mechanism 86 verifies the permissions granted for the member identification code embedded in the member request. Validation mechanism 87 verifies the member role for the member request. Validation mechanism 88 determines the member relationships allowed for the member request. If the requested business transaction passes the permitted permissions, role and relationship tests, the appropriate command is issued on the storage bus 56 to activate the appropriate one of the business transaction program 71-79.

When an insurance company wants to use the shared industry platform 50 to support the distribution and sale of insurance products, it registers with the SIP administration and goes through a setup phase to establish participation of the company, participation of its selected products, and participation of the transactions that will operate on the platform 50. The process of registration and setup is one in which participant information is loaded into the databases 61-69 of the shared industry platform 50 and arranged so that the processing of the SIP is automated and controlled by that participant information. Components at each level can participate independently of components at other levels. For example, an MGA can participate without having the participation of the companies for whom it recruits agents. Likewise, an agent can participate in the SIP without having the participation of companies and MGA's with whom the agent contracts to sell products. Consumers can participate without the participation of any other elements of the insurance industry.

Of course, the shared industry platform 50 can automate business transactions between only those parties that participate in the platform, hence business exchanges between parties by means of the SIP 50 requires that both parties participate in the SIP. Since not all business transactions will be implemented on the SIP 50, there may be non-SIP business transactions as well as SIP business transactions taking place between any two components of the industry. The strength of the shared industry platform is that it allows companies to continue doing business in their usual manner, in addition to participating in the SIP, thus allowing an evolutionary, substitutive adoption of SIP functionality, rather than a forced all-or-nothing transition.

The first step in registering an insurance industry member is to insert a row into the member database 61, in the manner shown in FIG. 11, by assigning a unique member identifier (M01, M02, M03, etc.) and including member information such as name, organization type, and SIP Role. The SIP mechanism by which member database rows are inserted is a computer program called the membership transaction program 71, which is one of the business programs 58 shown in FIGS. 8 and 9. When membership processing is required, the membership transaction program 71 is copied from data storage unit 55 to random access memory 53 and there executed by the CPU 52. This program includes functionality both for online maintenance by an individual person and also for batch mode insertions of data obtained from files transmitted to the SIP 50 by the insurance company.

The structure of the member database 61 is shown in tabular form in FIG. 11. The first row of the table shows an insurance company named INSCOA that is registered with uniquely-valued member identifier M01, organization type "corporation", SIP role "company", and Register Date "Jan. 1, 2000". The Member database 61 holds a separate row for each and every participating company, MGA, agent, and consumer. As exemplified in FIG. 11, INSCOA and INSCOB are participating insurance companies; MGA1 and MGA2 are participating managing general agencies; AGENT1, AGENT2, AGENT3, and AGENT4 are participating agents; and CONSUMER1, CONSUMER2, CONSUMER3, and CONSUMER4 are participating consumers. All computer programs executing as part of the shared industry platform 50 read the member database 61 to validate that a party is a registered SIP participant and to determine the SIP Role under which the party operates within SIP transactional processing operations.

Many companies will typically possess information about all members within its sales distribution hierarchy, and will therefore have the capability of providing to the SIP 50 the names and information of those related parties. Such a company could register all members of its distribution force as part of its own registration process. However, it is important to emphasize that companies do not control the participation of other components of the industry in regards to the SIP 50. The MGA's that act as distributors can register with the SIP 50 independently of any company with which they contract, in which case these MGA's will register themselves and provide their required information for establishing the required rows in the member database 61. Likewise, agents and consumers can independently register to participate in the shared industry system, without being affiliated with a company or MGA. To repeat, an element at any level (company, MGA, agent, consumer) can register and participate with the SIP, independently of the action of any element residing at a higher or lower level in the industry structure.

The fundamental structure of insurance distribution and sales is that the agent has the freedom to sell for many different insurance companies. The means by which an agent agrees to sell for a company is a contract known as an "appointment". An agent may contract directly with a company ("appoint directly to a company"), or may contract through an MGA to sell for the company ("appoint to a company through an MGA"). The specific clauses and bindings of these various contractual relationships are generally known as "business rules", and the accurate implementation of business rules is a critical part of the SIP computer program logic. More specifically, the business rules for an insurance sales distribution hierarchy are as follows:

Business Rule 1: an agent can appoint to one or more companies;

Business Rule 2: an agent can appoint to a company directly, or can appoint to a company through an MGA;

Business Rule 3: an agent can appoint to a given company only once, either through one MGA or through a direct appointment;

Business Rule 4: an agent can appoint to multiple different companies through the same MGA;

Business Rule 5: an agent can appoint to multiple different companies through multiple different MGA's;

Business Rule 6: when an agent appoints to a company through an MGA, the MGA shares in the commission paid on product sales as reward for its support of the agent sales process.

Figure 12:
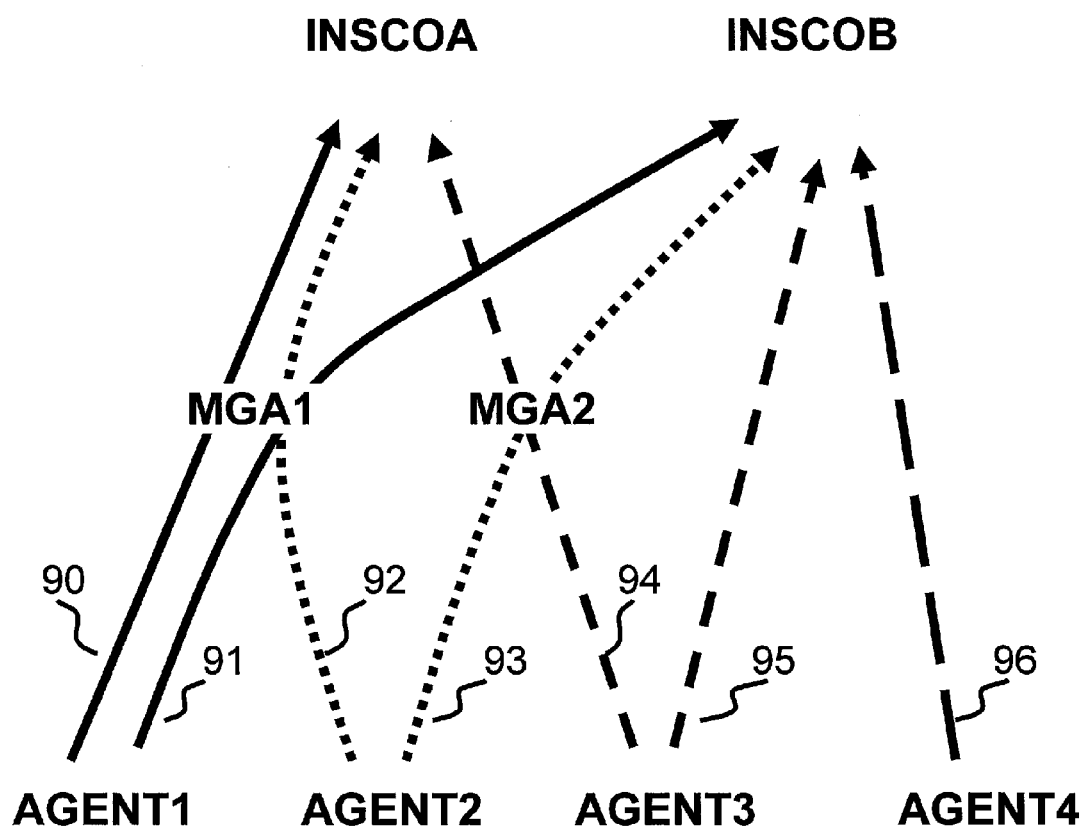
FIG. 12 shows a representative insurance industry distribution hierarchy with agent appointments to companies with and without intervening managing general agencies.

FIG. 12 shows an example distribution hierarchy in which these business rules are represented as hierarchical paths connecting the agents to their companies through MGA's in some cases, and directly in others. For example, the directed line 90 shows the hierarchical distribution path of agent AGENT1, who appoints to company INSCOA through managing general agency MGA1. A separate line 91 shows agent AGENT1 appointing to a different company, INSCOB, through the same general agency MGA1. Agent AGENT1 exemplifies one agent appointing to multiple different companies through the same general agency, thus illustrating Business Rule 1 and Business Rule 4.

Also in FIG. 12, the directed line 92 shows the hierarchical distribution path of agent AGENT2, who appoints to company INSCOA through general agency MGA1. A separate line 93 shows agent AGENT2 appointing to a different company, INSCOB, through a different general agency MGA2. Agent AGENT2 is an example of one agent appointing to multiple different companies through multiple different general agencies, thus illustrating Business Rule 1 and Business Rule 5.

As further shown in FIG. 12, a directed line 94 represents the hierarchical distribution path of an agent AGENT3, who appoints to company INSCOA through general agency MGA2 and who appoints to company INSCOB directly, as indicated by line 95. Agent AGENT3 is an example of an agent appointing to multiple different companies, through a general agency for one appointment and directly for the other appointment. Similarly, an agent AGENT4 appoints only to company INSCOB with a direct appointment, as indicated by line 96. These last two agents illustrate Business Rule 1 and Business Rule 2.

Note that these examples all obey Business Rule 3, which states that an agent can appoint to a given company only once.

The implementation of these hierarchical relationships is accomplished by the shared industry platform 50 by means of the distribution database 62, in which each appointment is recorded as a row in a distribution table, as represented by the table of FIG. 13. Row D01 of the distribution database 62 of FIG. 13 shows that agent AGENT1, identified by Member Identifier M05, is appointed to company INSCOA, identified by Member Identifier M01, through general agency MGA1, identified by Member Identifier M03, and that the Start Date of the relationship was Apr. 1, 2000. In like manner, each row of the distribution database 62 represents an entire leg of the hierarchy diagram of FIG. 12, extending from agent to company, and possibly including a general agency. Row D06 of the distribution database 62 represents the direct appointment of agent AGENT3 to company INSCOB, hence the MGA name and member identifier positions are blank to indicate that the appointment does not include an MGA. The rows of the distribution database 62 are an embodiment of the complete sales distribution hierarchy, and are the means by which the shared industry platform 50 implements the business rules that govern the distribution hierarchy. Any specific relationship among entities is determined by having the SIP computer programs read the rows of the distribution database 62.

When a company participates in the SIP, it will select the particular products that it wants to participate and will select which of the product-related business transactions will participate. For each product that participates, a row will be inserted into the SIP's Product Database 63, as shown in FIG. 14. The business computer program that maintains the product database 63 assigns each product a unique product identifier (P01, P02, etc.) and also captures the product name, company name, sales commission information, and product effective date. The example of FIG. 14 shows the rows for products from our two exemplary insurance companies. Company INSCOA has four insurance products that participate—LIFE1, LIFE2, ANNUITY1, and ANNUITY2. Company INSCOB has three products—GOODLIFE1, GOODLIFE2, and GOODANNUITY1.

A first means for implementing a transaction on the SIP 50 is to have a shared industry platform database to store data required by the specific transaction. A second means for implementing a transaction on the SIP 50 is to have a shared industry platform computer program to provide processing logic to carry out the computational steps of the transaction. In the illustrated embodiment, the following transactions will participate in the SIP 50:

Transaction 1: Application to Purchase;

Transaction 2: Sales Transaction;

Transaction 3: Commission Payout;

Transaction 4: Consolidated Sales and Commission Report.

A consumer wishing to purchase a life insurance product talks with an agent to gain information about his needs and the products benefits, and then fills out an application and gives the agent a premium check made out to the insurance company to pay for the first several months coverage and to make the application a binding application that allows coverage to begin as of the application date.

Figure 15:
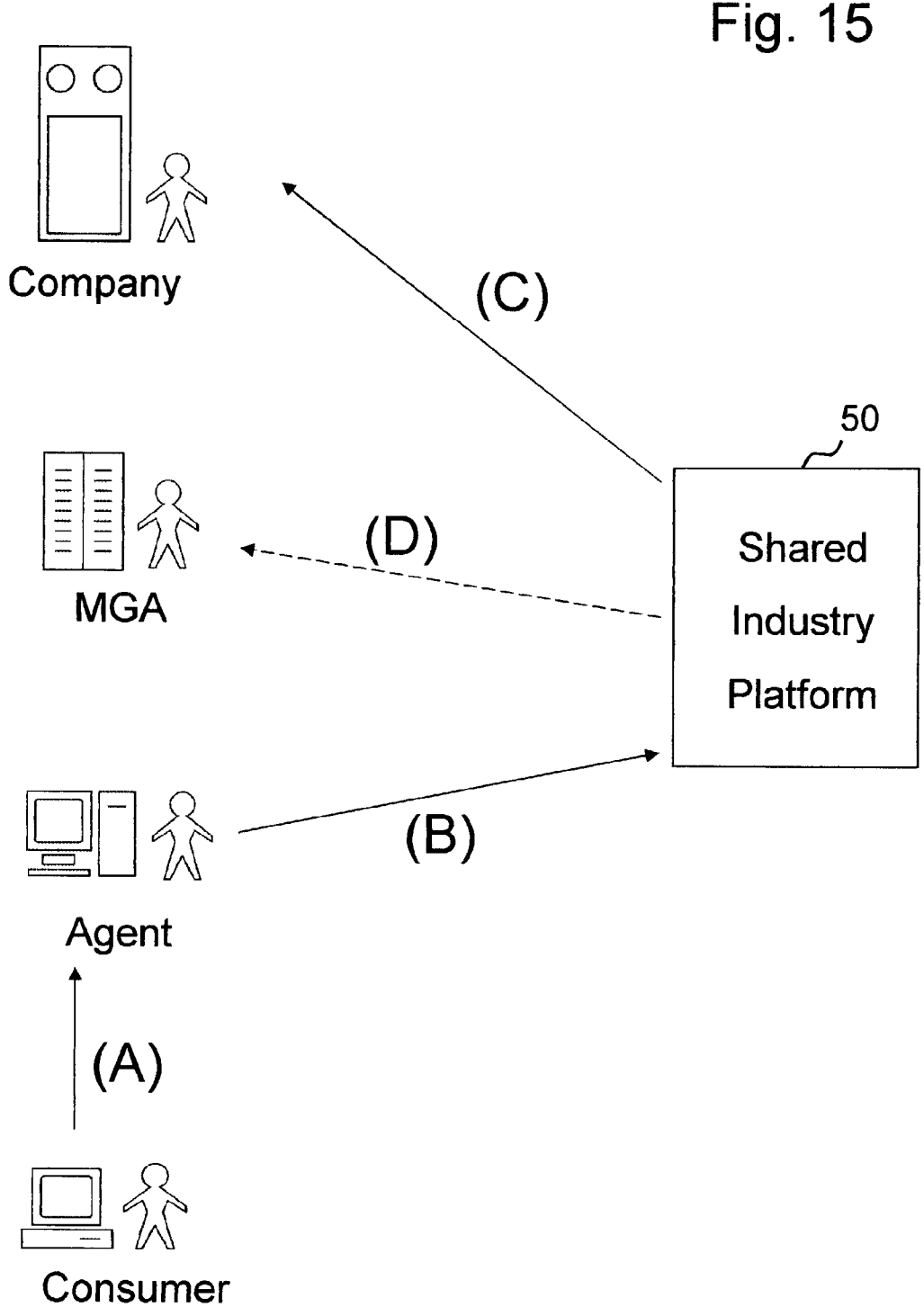
FIG. 15 is a pictorial drawing showing the primary data flow paths in a typical application to purchase type business transaction.

Path (A) of FIG. 15 shows the agent and consumer meeting to fill out an application, which may be data entered into a laptop personal computer carried by the agent, where it is stored as a data file. After entry into the laptop, the application data file is transmitted to the shared industry platform 50 via path (B) of FIG. 15, where it is processed by the SIP application transaction computer program 74 that reads the data file and inserts a row into the application database 64 shown in FIG. 16. The application database 64 contains a unique value for the Application Identifier field, which uniquely identifies the application, and also captures the product name, product face value, company name, consumer name, agent name, and application date. The application transaction program also pushes the application information to the insurance company via path (C) of FIG. 15, where it is inserted into a company database that contains application information. Optionally, a copy of the application may be supplied to an MGA via path (D).

An important characteristic of the application database 64 to make note of is that it consolidates applications from the entire industry, comprising multiple companies, MGA's and agents whose application data files would normally be stored in separate proprietary databases housed at separate facilities. The processing of the application transaction computer program 74 has security features that prevents one participating member from reading the data of other participating members, unless the members are joined in a contractual relationship, such as an appointment, that authorizes one party to have access to the information owned by the other. For example, the company who appoints an agent has the authority to read that agent's product applications, sales, and commissions information. Likewise, and MGA that appoints agents has the authority to read agent information on all their hired agents.

Figure 17:
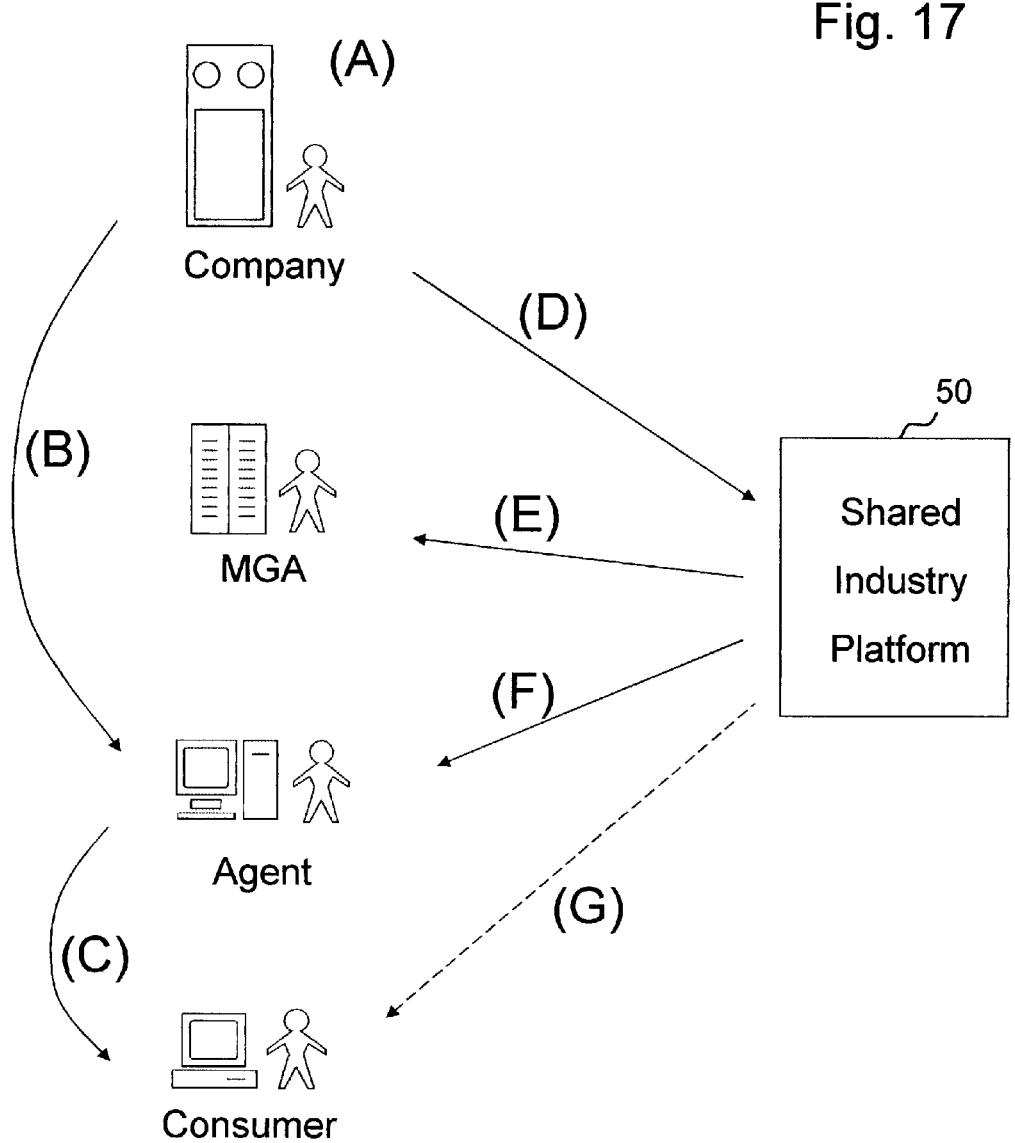
FIG. 17 is a pictorial drawing showing the primary data flow paths in a representative sale type business transaction.

When the company receives a completed application to purchase an insurance product, say a life insurance policy, it performs an underwriting function that includes evaluating the consumer making the application, considering the medical and financial condition of the applicant. This decision process is shown as item (A) in FIG. 17. When the company approves the application, the sale is complete and the company updates its own application database to mark the application approved, and it also inserts rows into its own sales and product administration databases.

The next step is to convey a finished contract, known as a "policy", to the insured consumer. Some companies traditionally print the policy and mail it to the agent, via path (B) of FIG. 17, who meets personally with the consumer to deliver the completed financial contract and to review the specifics of product maintenance and beneficiaries, as shown in path (C) of FIG. 17. Companies that participate in the shared industry platform have the added option of transmitting their completed sales information to the SIP 50 via path (D) of FIG. 17, where the information is processed by the SIP sales transaction program 75 and inserted into the sale database 65. As shown in FIG. 18, the sales database 65 holds a row for each completed sale, with a unique assigned Sale Identifier and information about the consumer, the agent, the sale date, and the product. Once synchronized onto the SIP 50, the sale data is accessible by the participating MGA and agent, who can pull the information into their own computers via paths (E) and (F) of FIG. 17. The electronic transmittal of data to the SIP 50 and thence to the agent puts a copy of the binding contract into the hands of the agent via path (F) and consumer much faster than the traditional printed-paper method of policy delivery. Optionally, the policy may be delivered from SIP 50 directly to the consumer by way of path (G).

Figure 19:
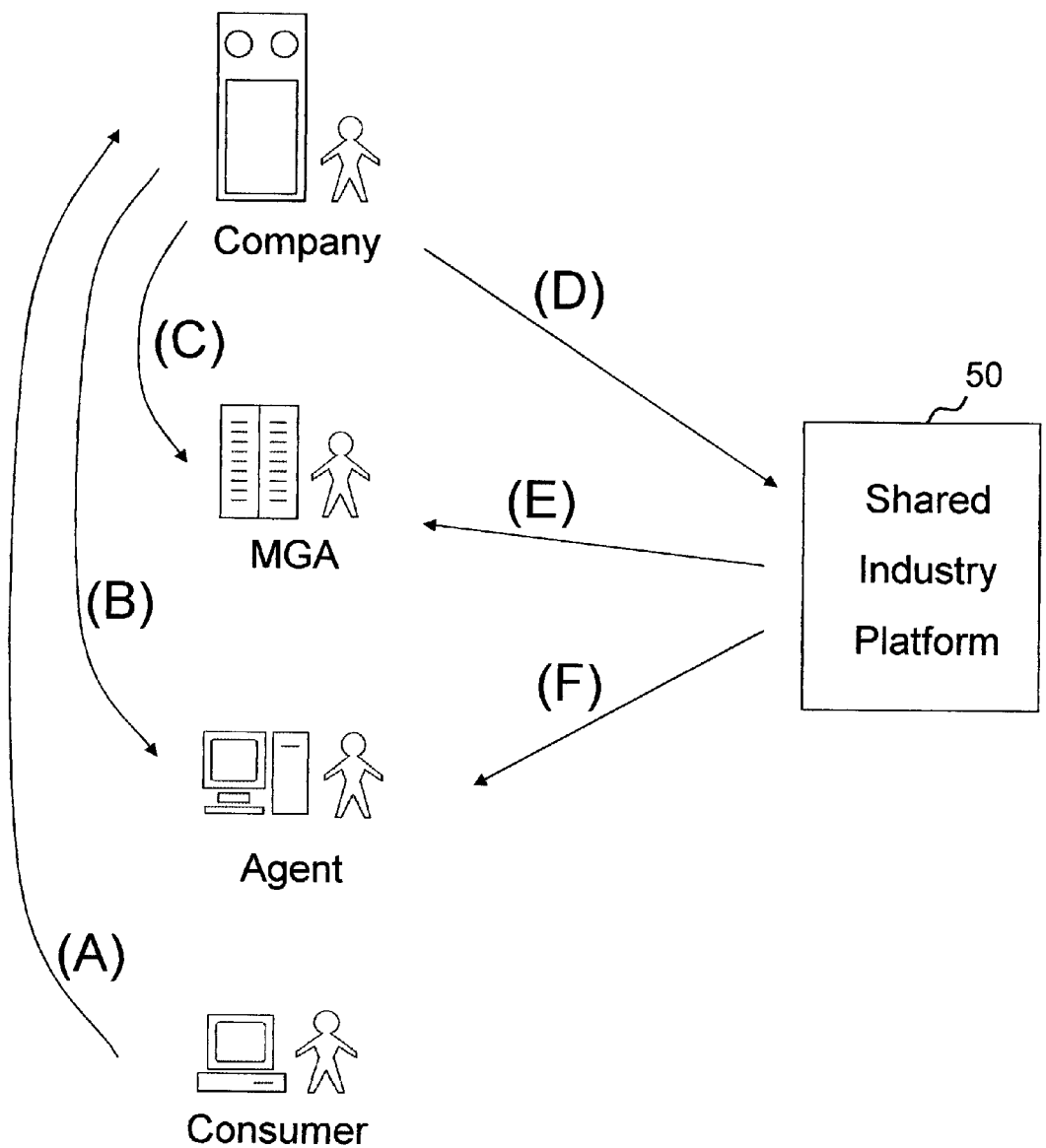
FIG. 19 is a pictorial drawing showing the primary data flow paths in a typical commission payment type business transaction.

When a consumer pays a premium on an insurance policy, or makes an additional purchase of an annuity, a commission is paid to the agent and to the MGA, if one is party to the sale transaction. The consumer's payment is typically mailed to the company, as exemplified by path (A) of FIG. 19, where it is recorded as a received payment. Commissions are calculated at the company by referral to the product database 63 to retrieve the commission code and description, and to the distribution database 62 to determine the MGA involved, if any. Commission payments are then either printed and mailed or electronically deposited in an appropriate account for the agent, path (B) of FIG. 19, and an account for the MGA, path (C). As a further option, the SIP 50 may include a payment program 76 for performing electronic funds transfer of commission payments to bank accounts of the agent and the MGA involved with the sale of the insurance policy.

An important task for the agent is checking the status of upcoming commissions, in order to forecast revenue. When all parties to the transaction are participating in the shared industry platform 50, the commission status information is sent from the company to the SIP 50 immediately upon receipt of payment, via path (D). The SIP's commission transaction computer program 77 will insert the commission information into the SIP commission database 67, with one row representing each commission payout transaction, as shown in FIG. 20. Once the SIP commission database is updated, the MGA and agent can retrieve and review the commission status via paths (E) and (F) of FIG. 19. In addition, the agents can pull commission information from the SIP 50 for all their participating companies, thus obtaining a consolidated view of their future revenue. The SIP 50 can support the electronic payment of commissions, if the companies require such transaction support.

Figure 21:
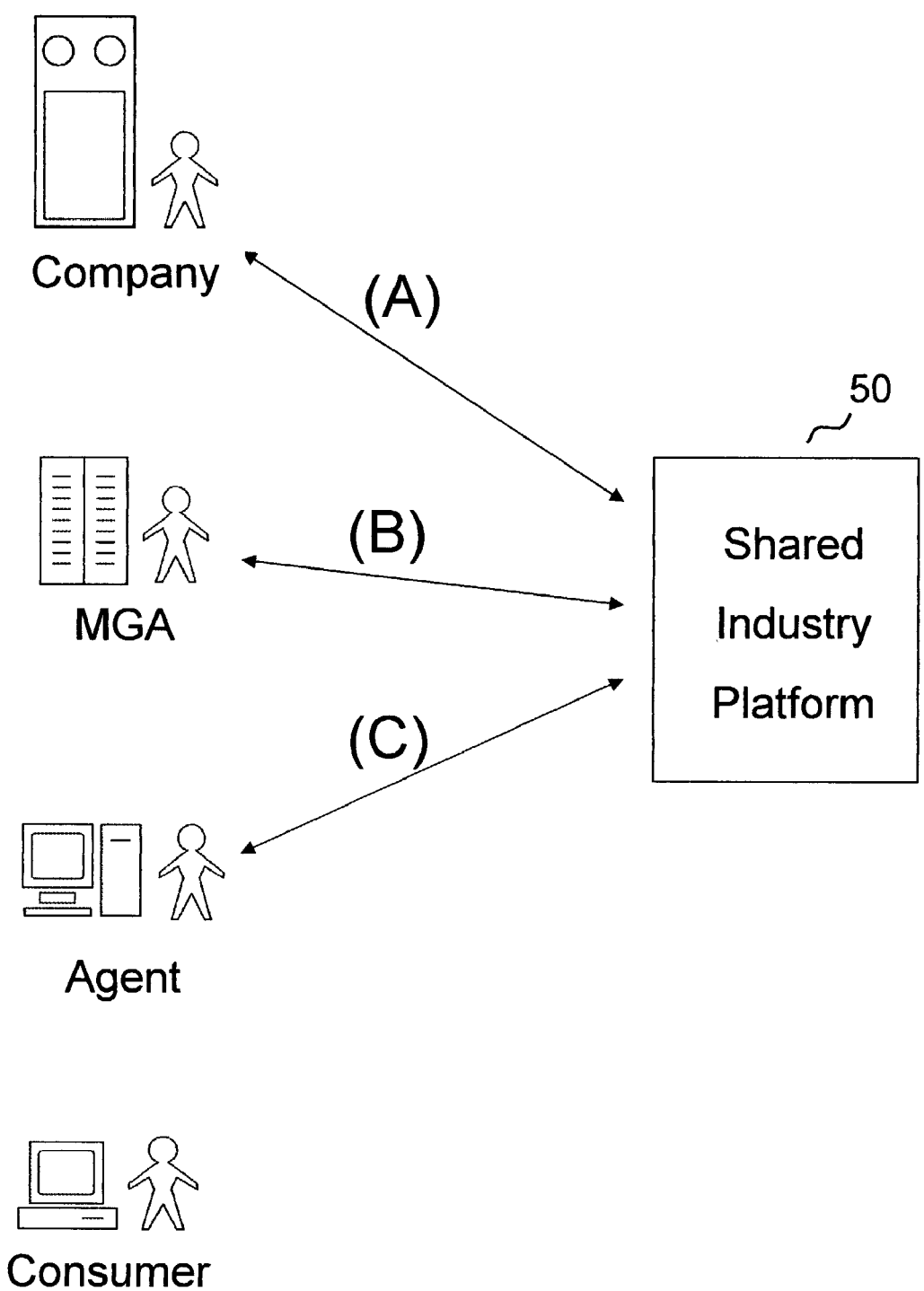
FIG. 21 is a pictorial drawing showing primary data flow paths for one or more consolidated sales and commissions report type business transactions.

As the above commission transaction shows, a major advantage of the shared industry platform 50 is the ability to obtain views of information that are consolidated across all companies of the industry. An example of this is the case of consolidated sales and commission reports. The primary data flow paths for such reports is shown in FIG. 21. Since the information within SIP databases is cross-industry, however, no participating member will ever have direct, unrestricted access to the databases because the databases contain information from competing enterprises.

One embodiment for maintaining the required security for database reporting is to establish a reporting database such as the sales and commission report database 68 represented by the table of FIG. 22, in which each report is custom-created for the requester. Report R01 of FIG. 22, for example, is for company INSCOA and reports sales and commissions starting up at the company level and going down to the agent level and including all agents who appoint through an MGA. This report will include MGA summaries. Report R04, on the other hand, is a company-requested report starting at the agent level and extending down to consumers, for all agents who are directly appointed with the company. This report will clearly show the sales and commission performance of direct agents and will show what consumers are being reached by the direct agents. Comparing report R04 with a similar report for MGA-appointed agents will show differences in the sales performance of direct versus non-direct agents.

Figure 23:
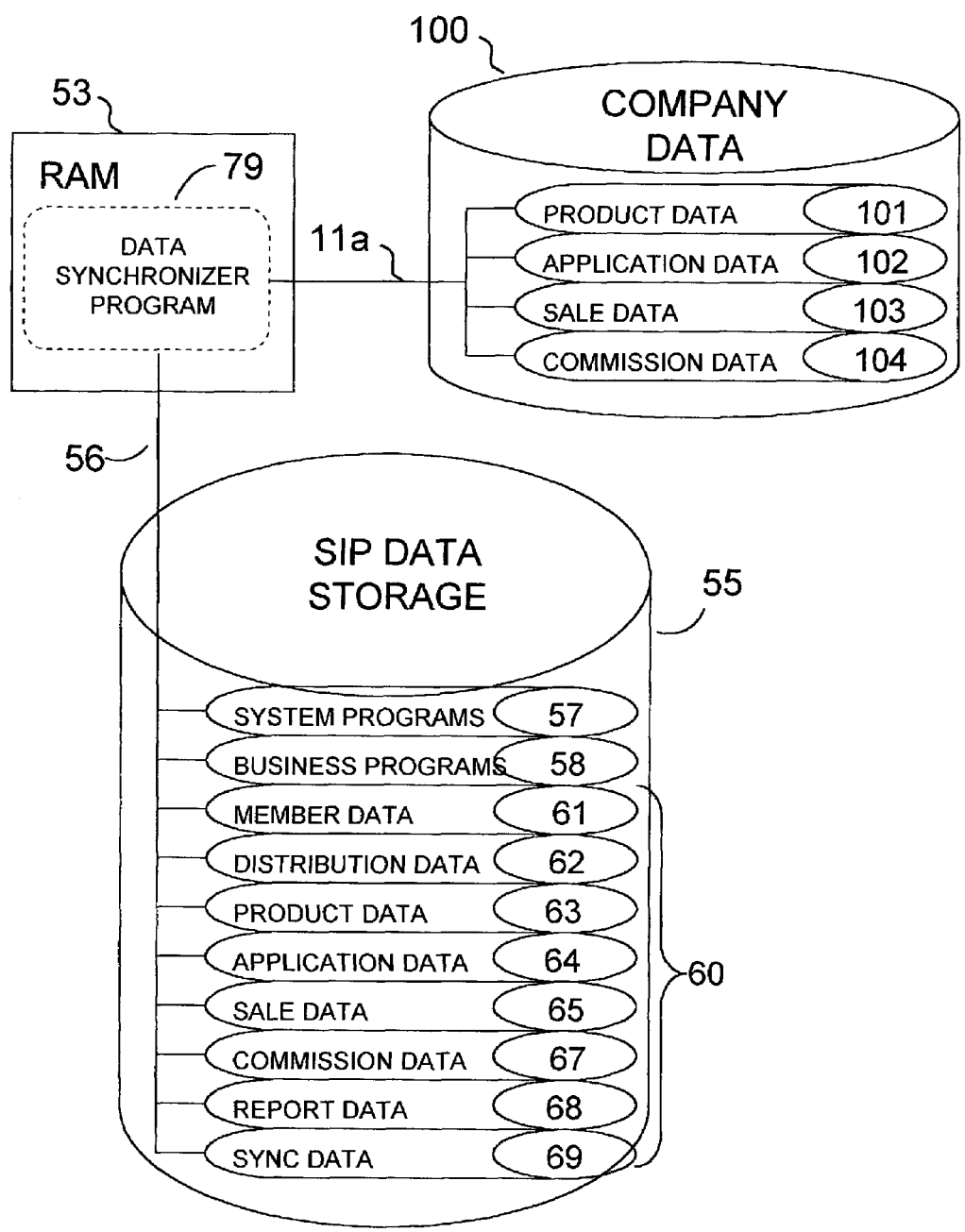
FIG. 23 is a block diagram used in explaining the operation of a data synchronizer mechanism which may be used for transferring data from an insurance industry member to the shared industry platform.

FIG. 23 is a block diagram showing the major system components involved in a data synchronizer mechanism which may be used for transferring data from an insurance industry member to the shared industry platform 50. A key component of this mechanism is a data synchronizer program 79 which is one of the business programs 58 stored in the SIP data storage 55. This program is initiated by causing CPU 52 to load a copy of the data synchronizer program 79 into the SIP RAM 53. For sake of example, it is assumed that the data is to be transferred from an insurance company database 100 to one or more of the SIP databases 60. In the example of FIG. 23, the company database 100 is assumed to include a product database 101, an application database 102, a sale database 103 and a commission database 104. These databases 101-104 are stored in one or more data storage units associated with the mainframe computers that perform corporate business processing for the insurance company. Communication is accomplished by way of the global computer network 45, which is assumed to be an Internet communication network. This connection is represented in FIG. 23 by the data flow path 11*a*.

The data synchronizer program 79 makes use of a synchronizer database 69 which is maintained in the SIP data storage unit 55. The nature of this synchronizer database 69 is represented by the table of FIG. 24. It is a schedule of the industry members and their databases which are to be transferred to the shared industry platform 50. FIG. 24 shows only a representative fragment of the sync database 69. In practice, there would be many more entries, with one or more entries for most of the insurance industry members participating in the shared industry platform 50.

Figure 25:
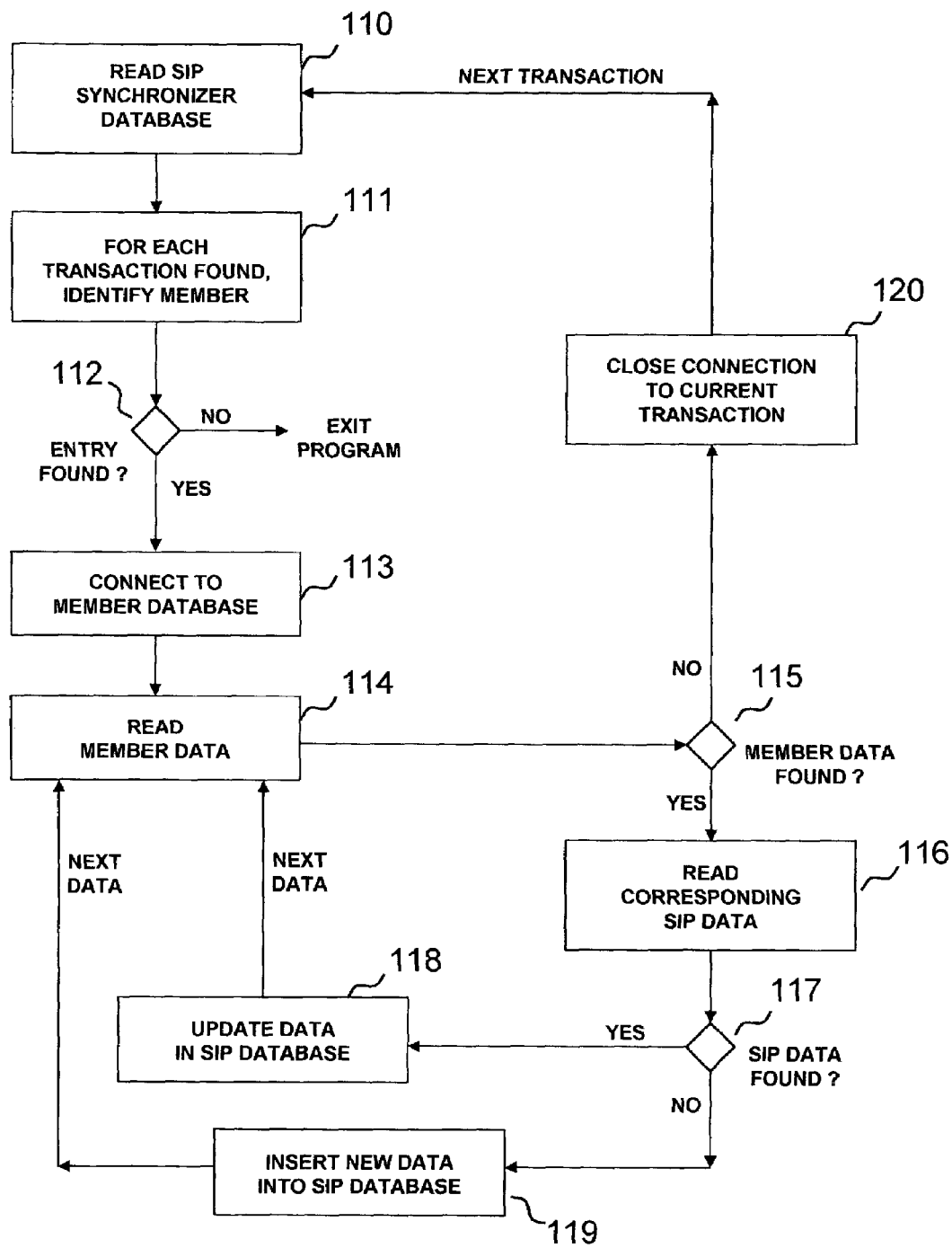
FIG. 25 is a detailed flowchart for a data synchronizer program which runs the data synchronizer mechanism of FIG. 23.

FIG. 25 is a flowchart for a preferred embodiment of the data synchronizer program 79 of FIG. 23. As shown in FIG. 25, the data synchronizer program 79 will first read the SIP synchronizer database 69 to obtain the sync data for the next entry or transaction listed in the sync database 69. This is indicated at step 110 in FIG. 25. For each transaction found, the next step 111 is to identify the member found. Decision point 112 determines whether a valid entry was found in sync database 69. If the answer is no, the shared industry platform 50 exits the synchronizer program. If yes, synchronizer program 79 proceeds to the next step 113 and establishes a connection with the member database (in this example, company database 100) via the Internet network 45. Assume, for example, that the entry found is the first entry in sync database table 69 of FIG. 24. In this case, the connection is made to the application database 102 in the company database 100 of insurance company INSCOA.

After the connection is established, the next step 114 is to read the member data from the connected member database which, in this example, is the data from company application database 102. Decision point 115 determines whether any data was found in the company database 102. If the answer is yes, synchronizer program 79 proceeds to read the corresponding data from the SIP database 60. In the current example, the SIP data is read from the SIP application database 64.

Decision point 117 determines whether any corresponding SIP data was found. If the answer is yes, the data synchronizer program 79 proceeds to update the data in the SIP application database 64 to agree with the data received from the company application database 102. This updating mechanism is represented by step 118 in FIG. 25. After completion of the update operation for the first data item, data synchronizer program 79 returns to step 114 to repeat the process for the next data item in SIP application database 64.

If decision point 117 determines that there is no corresponding SIP data item, data synchronizer program 79 proceeds to a data insertion mechanism 119 for inserting the data item read from the company database 102 into the SIP database 64. After completion of this data insertion operation, data synchronizer program 79 returns to step 114 to continue the processing of the next data item received from company application database 102. In this manner, by updating existing SIP data items and inserting new SIP data items, the SIP application database 64 is made to agree with the current version of the company application database 102.

When decision point 115 determines that there are no more data items to process for the company application database 102, the data synchronizer program 79 proceeds to step 120 and closes the connection to the current transaction, namely, the company application database 102. The data synchronizer program 79 then returns to step 110 to read the next transaction entry from the SIP synchronizer database 69. The foregoing series of steps 111-119 are then performed for the next entry in SIP database 69. In this step-by-step manner, data synchronizer program 79 proceeds to update all the various business transaction databases 60 in the SIP data storage unit 55. Data synchronizer program 79 is particularly well-suited for batch transfers of data from insurance industry members to the shared industry platform 50. Such batch transfers may be done on a regular basis (e.g., monthly, weekly, nightly). This enables large amounts of data to be transferred to the shared industry platform 50 and made available to the appropriate insurance industry members.

The present invention relates generally to the enhancement of existing components of the insurance industry by a computer-implemented, network-enabled shared industry platform that utilizes the Internet as a primary means of accomplishing same. More specifically, the present invention enables the extension of the insurance industry business model by employing the Internet to create new, non-invasive and non-threatening relationships among various elements of the traditional insurance industry, by creating a common language for the industry, and by creating streamlined interactive access for every component of the insurance industry.

The present invention describes an evolutionary system for network-enabling the insurance industry and putting new business capabilities in the hands of both consumers and insurance professionals at all levels of the industry. This new system unifies the insurance industry by enhancement and substitution of transactional capability, rather than by diminishing or restructuring any element of the industry.

Although the network-enabled extended hierarchy business model of the present invention has been described in terms of various specific embodiments and scenarios, the invention is not limited to those specific embodiments and scenarios, but may extend beyond them as further modifications and applications become apparent to those skilled in the arts of this technology and industry. Thus, a particular combination of elements described and illustrated herein is intended to represent a presently preferred embodiment of the invention, and is not intended to serve as a limitation with respect to alternative embodiments which fall within the spirit and scope of the invention.

While there have been described what are at present considered to be preferred embodiments of this invention, it will be obvious to those skilled in the art that various changes and modifications may be made therein without departing from the invention and it is, therefore, intended to cover all such changes and modifications as come within the true spirit and scope of the invention.

What is claimed is:

1. A system for sharing information among companies, agencies, and agents, the system comprising:
   a memory configured to store the information and programs, wherein the information comprises insurance data, including customer, sales, agent, and commissions data, and wherein the memory is further configured to store business roles and business relationship rules for the companies, the agencies, the agents, and customers;
   a processor, coupled to the memory, configured to access the memory for the information, the business roles, and the business relationship rules, and run the programs stored in the memory;
   a communication port, coupled to the processor, configured to transfer the information, under control of the processor, between the memory and each of the companies, the agencies, the agents, and customers;
   wherein the information further comprises business relationship data among the companies, the agencies, the agents, and the customers, with the companies offering insurance products for purchase by the customers directly, for purchase by the customers through the agents, or for purchase by the customers through the agents affiliated with the agencies; and
   wherein the programs comprise:
      a permissions program adapted to determine if a request from one of the companies, the agencies, the agents, or the customers is valid based on the business roles and the business relationship rules stored in the memory;
a membership program adapted to register new ones of the companies, the agencies, the agents, and the customers and their business roles within the system and store in the memory; and
a distribution program adapted to register the companies, the agencies, the agents, and the customers and their business relationship data among the companies, the agencies, the agents, and the customers and store in the memory, wherein the business relationship data registered is subject to the business relationship rules which govern vertical sales distribution hierarchies between the companies and the agencies, between the companies and the agents, and between the agencies and the agents, and wherein the programs permit the companies, the agencies, and the agents to enter information available only to the company, the agency, or the agent that entered the information and enter information about one or more companies, agencies, or agents which have not been registered by the membership program; and
wherein the information stored in the memory is shared among the companies, the agencies, and the agents based on the business relationship rules as determined by the permission program and the distribution program, with business relationships established horizontally and vertically in hierarchical relationships among the companies, the agencies, the agents, and the customers such that the companies, the agencies, the agents, and the customers are able to establish independent vertical hierarchical relationships and the agents are able to establish horizontal business relationships to form agencies within the vertical hierarchical relationships, and wherein the programs provide for the information to be displayed only to the company, the agency, or the agent that entered the information along with the information that is shared and provide for the company, the agency, and the agent to each participate independently within the system without requiring participation with the other registered companies, agencies, or agents within the system, with at least a portion of the information, available only to one or more of the agencies, the agents, or the customers that are lower vertically in the hierarchical relationship relative to the company, the agency, or the agent that entered the information, and not shared with one or more companies that are higher vertically in the hierarchical relationship.

2. The system of claim 1, wherein one of the companies, the agencies, the agents, and the customers may form a relationship with another one of the companies, the agencies, the agents, and the customers as determined by the permission program and the distribution program and form a private relationship with another company, agency, or agent which has not been registered by the membership program.

3. The system of claim 1, wherein the business relationship rules permit the agent to determine whether to appoint to one or more of the companies, permit the agent to determine whether to appoint to one of the companies directly or through one of the agencies, permit the agent to determine whether to appoint to a given one of the companies only once either directly or through one of the agencies, permit the agent to determine whether to appoint to a number of the companies through the same agency, permit the agent to determine whether to appoint to a number of the companies through a plurality of the agencies, and permit the agency to determine whether to share in a commission paid to the agent if the agent is appointed to one of the companies through the agency.

4. The system of claim 1, wherein the memory comprises a member database and a distribution database accessed by the membership program and the distribution program, respectively, and by the permissions program.

5. The system of claim 1, wherein the programs further comprise:
a products program adapted to register products with product identifiers and associate the products with corresponding ones of the companies; and
an application program adapted to register applications with application identifiers and associate with the agent, the customer, and the company.

6. The system of claim 5, wherein the memory comprises a product database and an application database accessed by the products program and the application program, respectively.

7. The system of claim 1, wherein the programs further comprise:
a sales program adapted to record sales with sales identifiers and associate with the agent, the customer, and a product;
a payment program adapted to perform electronic funds transfer of commission payments to the agents; and
a commission program adapted to record commission payments to the agents.

8. The system of claim 7, wherein the memory comprises a sales database and a commission database accessed by the sales program and the commission program, respectively.

9. The system of claim 1, wherein the programs further comprise a report program adapted to generate sales and commission reports for the companies, the agencies, and the agents, and wherein the memory comprises a sales and commissions report database accessed by the report program.

10. The system of claim 9, wherein the programs further comprise a data synchronizer program adapted to synchronize the information stored in the memory with data stored at one or more of the companies.

11. The system of claim 10, wherein the memory comprises a synchronizer database accessed by the data synchronizer program.

12. A system comprising:
means for storing information to share among various entities based on their business role and business relationship rules stored in the storing means, wherein the entities comprise companies, agencies, agents, and customers, and wherein the information comprises insurance data, including customer, sales, agent, and commissions data, and further comprises business relationship data for the companies, the agencies, the agents, and the customers, with the companies offering insurance products for purchase by the customers directly, for purchase by the customers through the agents, or for purchase by the customers through the agents affiliated with the agencies;
means for communicating the information between the system and the entities via a network;
means for determining if a request from one of the entities is permitted based on their business role and the business relationship rules;
means for registering new ones of the entities and their business role within the system;
means for recording the business relationship data of the new ones of the entities relative to the existing ones of the entities subject to the business relationship rules which govern vertical sales distribution hierarchies between the companies and the agencies, between the companies and the agents, and between the agencies and the agents, wherein the business relationship rules permit the entities to form a private business relationship with an entity which has not been registered in the system by the registering means and which is not governed by the determining means and the business relationship rules; and wherein the information in the storing means is shared among the companies, the agencies, and the agents based on the determining means and subject to the business relationship rules which govern horizontal and vertical hierarchical relationships such that the companies, the agencies, the agents, and the customers are able to establish independent vertical hierarchical relationships and the agents are able to establish horizontal business relationships to form agencies within the vertical hierarchical relationships, and wherein the storing means further stores information to be displayed only to the company, the agency, or the agent that entered the information along with the information that is shared and provide for the company, the agency, and the agent to each participate independently within the system without requiring participation with the other registered companies, agencies, or agents within the system, with at least a portion of the information, available only to one or more of the agencies, the agents, or the customers that are lower vertically in the hierarchical relationship relative to the company, the agency, or the agent that entered the information, and not shared with one or more companies that are higher vertically in the hierarchical relationship.

13. The system of claim 12, wherein one of the entities may form a business relationship with one or more of the entities as governed by the determining means and business relationship rules set forth by the one or more entities, and wherein the business relationship rules permit the agent to determine whether to appoint to one or more of the companies, permit the agent to determine whether to appoint to one of the companies directly or through one of the agencies, permit the agent to determine whether to appoint to a given one of the companies only once either directly or through one of the agencies, permit the agent to determine whether to appoint to a number of the companies through the same agency, permit the agent to determine whether to appoint to a number of the companies through a plurality of the agencies, and permit the agency to determine whether to share in a commission paid to the agent if the agent is appointed to one of the companies through the agency.

14. The system of claim 13, further comprising:
means for registering products with product identifiers and associating the products with corresponding ones of the companies; and
means for registering applications with application identifiers and associating the applications with the agent, the customer, and the company.

15. The system of claim 14, further comprising:
means for recording sales with sales identifiers and associating the sales with the agent, the customer, and a product;
means for performing electronic funds transfer of commission payments to the agents; and
means for recording commission payments to the agents.

16. The system of claim 15, further comprising:
means for generating sales and commission reports for the companies, the agencies, and the agents; and
means for synchronizing the information in the storing means with data stored at one or more of the companies.

17. A method comprising:
storing information within a memory of a computer system to share among various entities based on business roles and business relationship rules, wherein the entities comprise companies, agencies, agents, and customers, and wherein the information comprises insurance data, including customer, sales, agent, and commissions data, and further comprises business relationship data for the companies, the agencies, the agents, and the customers based on insurance products offered by the companies for purchase by the customers directly, for purchase by the customers through the agents, or for purchase by the customers through the agents affiliated with the agencies;
receiving a request via a communication port of the computer system from one of the entities;
determining if the request from one of the entities is permitted based on their business role and the business relationship rules;
registering new ones of the entities and their business role within the system;
recording the business relationship data of the new ones of the entities relative to the existing ones of the entities subject to the business relationship rules which govern vertical sales distribution hierarchies between the companies and the agencies, between the companies and the agents, and between the agencies and the agents, wherein the business relationship rules permit the entities to form a private business relationship with an entity which has not been registered in the system by the registering and which is not governed by the determining and the business relationship rules; and
sharing the stored information among the companies, the agencies, and the agents subject to the business relationship rules which govern horizontal and vertical hierarchical relationships such that the companies, the agencies, the agents, and the customers are able to establish independent vertical hierarchical relationships and the agents are able to establish horizontal business relationships to form agencies within the vertical hierarchical relationships, and wherein the storing further stores information to be displayed only to the company, the agency, or the agent that entered the information along with the information that is shared and provide for the company, the agency, and the agent to each participate independently within the system without requiring participation with the other registered companies, agencies, or agents within the system, with at least a portion of the information, available only to one or more of the agencies, the agents, or the customers that are lower vertically in the hierarchical relationship relative to the company, the agency, or the agent that entered the information, and not shared with one or more companies that are higher vertically in the hierarchical relationship, wherein the determining, the registering, the recording, and the sharing are controlled by a processor of the computer system executing instructions stored in the memory.

18. The method of claim 17, further comprising forming by one of the entities a business relationship with one or more of the entities as governed by the business relationship rules set forth by the one or more entities, wherein the business relationship rules permit the agent to determine whether to appoint to one or more of the companies, permit the agent to determine whether to appoint to one of the companies directly or through one of the agencies, permit the agent to determine whether to appoint to a given one of the companies only once either directly or through one of the agencies, permit the agent to determine whether to appoint to a number of the companies through the same agency, permit the agent to determine whether to appoint to a number of the companies through a plurality of the agencies, and permit the agency to determine whether to share in a commission paid to the agent if the agent is appointed to one of the companies through the agency.

19. The method of claim 18, further comprising:
registering products with product identifiers;
associating the products with corresponding ones of the companies;
registering applications with application identifiers; and
associating the applications with the agent, the customer, and the company.

20. The method of claim 19, further comprising:
recording sales with sales identifiers;
associating the sales with the agent, the customer, and a product;
performing electronic funds transfer of commission payments to the agents; and
recording commission payments to the agents.

21. The method of claim 20, further comprising:
generating sales and commission reports for the companies, the agencies, and the agents; and
synchronizing the information in the storing means with data stored at one or more of the companies.

22. A method comprising:
providing registration information to a shared database system to enroll as a member of the shared database system, wherein the registration information includes a name and a business role of the member along with any appointment business relationship with any other members which include companies, agencies, agents, and customers enrolled with the shared database system or with an entity that is not enrolled with the shared database system to form a private relationship;
receiving a member identification code corresponding to the member from the shared database system, wherein the shared database system is configured to share information among the members, wherein the information that is shared comprises insurance data, including customer, sales, agent, and commissions data, and further comprises business relationship data for the companies, the agencies, the agents, and the customers, with the insurance data including insurance products offered by companies for purchase by the customers directly, for purchase by the customers through the agents, or for purchase by the customers through the agents affiliated with the agencies;
providing a request from the member to the shared database system, wherein the request includes the member identification code embedded in the request and which is used by the shared database system to verify that the member identification code is valid and that the request is authorized based on the business role of the member and the business relationship rules among the members which govern vertical and horizontal hierarchies and the sharing of information among the members, wherein the business relationship rules permit the agent to determine whether to appoint to one or more of the companies, permit the agent to determine whether to appoint to one of the companies directly or through one of the agencies, permit the agent to determine whether to appoint to a given one of the companies only once either directly or through one of the agencies, permit the agent to determine whether to appoint to a number of the companies through the same agency, permit the agent to determine whether to appoint to a number of the companies through a plurality of the agencies, and permit the agency to determine whether to share in a commission paid to the agent if the agent is appointed to one of the companies through the agency;
designating information stored in the shared database system as shared among the companies, the agencies, and the agents based on the business relationship rules, with business relationships established horizontally and vertically in hierarchical relationships among the companies, the agencies, the agents, and the customers such that the companies, the agencies, the agents, and the customers are able to establish independent vertical hierarchical relationships and the agents are able to establish horizontal business relationships to form agencies within the vertical hierarchical relationships, and wherein the information is displayed only to the company, the agency, or the agent that entered the information along with the information that is shared and provide for the company, the agency, and the agent to each participate independently within the system without requiring participation with the other registered companies, agencies, or agents within the system, with at least a portion of the information, available only to one or more of the agencies, the agents, or the customers that are lower vertically in the hierarchical relationship relative to the company, the agency, or the agent that entered the information, and not shared with one or more companies that are higher vertically in the hierarchical relationship; and
receiving a response from the shared database system based on the request.

23. The method of claim 22, wherein the member is a company and the request comprises providing a product name and sales commission information to be stored by the shared database system along with other product names and sales commission information from other ones of the members that are companies.

24. The method of claim 22, wherein the member is an agent and the request comprises providing application information to be stored by the shared database system along with other application information from other ones of the members that are agents for various products of the members that are companies.

25. The method of claim 22, wherein the member is a company and the request comprises providing sales information to be stored by the shared database system along with other sales information from other ones of the members that are companies.

26. The method of claim 22, wherein the member is a company and the request comprises providing commission information to be stored by the shared database system along with other commission information from other ones of the members that are companies.

27. The method of claim 22, wherein the request is for a sales and commission report to be provided in the response by the shared database system based on stored sales and commission information of all of the members, with the sales and commission report subject to the role of the member and the business relationship rules.

28. The method of claim 22, wherein the member is a company and the request comprises providing product data, application data, sale data, and/or commission data to be synchronized and stored by the shared database system along with other product data, application data, sale data, and/or commission data from other ones of the members that are companies.

29. A computer system comprising:
a processor;
a memory adapted to store information and instructions;
a communication port, coupled to the memory, the processor, and to a network, configured to transfer information under control of the processor from the memory to the network;
wherein the processor is configured to execute the instructions stored in the memory to perform a communication process comprising:
providing registration information from the memory via the communication port to a shared database system coupled to the network to enroll as a member of the shared database system, wherein the registration information includes a name and a business role of the member along with any appointment business relationship with any other members which include companies, agencies, agents, and customers enrolled with the shared database system or with an entity that is not enrolled with the shared database system to form a private relationship;
receiving a member identification code, via the communication port from the shared database system, corresponding to the member from the shared database system, wherein the shared database system is configured to share information among the members, wherein the information that is shared comprises insurance data, including customer, sales, agent, and commissions data, and further comprises business relationship data for the companies, the agencies, the agents, and the customers, with the insurance data including insurance products offered by companies for purchase by the customers directly, for purchase by the customers through the agents, or for purchase by the customers through the agents affiliated with the agencies;
providing a request from the memory via the communication port to the shared database system, wherein the request includes the member identification code embedded in the request and which is used by the shared database system to verify that the member identification code is valid and that the request is authorized based on the business role of the member and the business relationship rules among the members which govern vertical and horizontal hierarchies and the sharing of information among the members, wherein the business relationship rules permit the agent to determine whether to appoint to one or more of the companies, permit the agent to determine whether to appoint to one of the companies directly or through one of the agencies, permit the agent to determine whether to appoint to a given one of the companies only once either directly or through one of the agencies, permit the agent to determine whether to appoint to a number of the companies through the same agency, permit the agent to determine whether to appoint to a number of the companies through a plurality of the agencies, and permit the agency to determine whether to share in a commission paid to the agent if the agent is appointed to one of the companies through the agency;
designating information stored in the shared database system as shared among the companies, the agencies, and the agents based on the business relationship rules, with business relationships established horizontally and vertically in hierarchical relationships among the companies, the agencies, the agents, and the customers such that the companies, the agencies, the agents, and the customers are able to establish independent vertical hierarchical relationships and the agents are able to establish horizontal business relationships to form agencies within the vertical hierarchical relationships, and wherein the information is displayed only to the company, the agency, or the agent that entered the information along with the information that is shared and provide for the company, the agency, and the agent to each participate independently within the system without requiring participation with the other registered companies, agencies, or agents within the system, with at least a portion of the information, available only to one or more of the agencies, the agents, or the customers that are lower vertically in the hierarchical relationship relative to the company, the agency, or the agent that entered the information, and not shared with one or more companies that are higher vertically in the hierarchical relationship; and
receiving a response via the communication port from the shared database system based on the request.

30. The computer system of claim 29, wherein the member is a company and the request comprises a product name and sales commission information to be stored by the shared database system along with other product names and sales commission information from other ones of the members that are companies.

31. The computer system of claim 29, wherein the member is an agent and the request comprises application information to be stored by the shared database system along with other application information from other ones of the members that are agents for various products of the members that are companies.

32. The computer system of claim 29, wherein the member is a company and the request comprises sales information to be stored by the shared database system along with other sales information from other ones of the members that are companies.

33. The computer system of claim 29, wherein the member is a company and the request comprises commission information to be stored by the shared database system along with other commission information from other ones of the members that are companies.

34. The computer system of claim 29, wherein the request is for a sales and commission report to be provided in the response by the shared database system based on stored sales and commission information of all of the members, with the sales and commission report subject to the role of the member and the business relationship rules.

35. The computer system of claim 29, wherein the member is a company and the request comprises product data, application data, sale data, and/or commission data to be synchronized and stored by the shared database system along with other product data, application data, sale data, and/or commission data from other ones of the members that are companies.

* * * * *